(12) United States Patent
Bubb et al.

(10) Patent No.: US 11,919,194 B2
(45) Date of Patent: Mar. 5, 2024

(54) METHODS OF PLUGGING A HONEYCOMB BODY

(71) Applicant: CORNING INCORPORATED, Corning, NY (US)

(72) Inventors: Keith Norman Bubb, Beaver Dams, NY (US); Theresa Chang, Painted Post, NY (US); Joseph Henry Citriniti, Corning, NY (US); Kevin Eugene Elliott, Horseheads, NY (US); Xinyuan Liu, Painted Post, NY (US); Robert John Locker, Corning, NY (US); Prashanth Abraham Vanniamparambil, Binghamton, NY (US); Kevin Lee Wasson, Elmira, NY (US); Shu Yuan, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/162,240

(22) Filed: Jan. 29, 2021

(65) Prior Publication Data

US 2021/0146574 A1 May 20, 2021

Related U.S. Application Data

(63) Continuation of application No. PCT/US2019/058752, filed on Oct. 30, 2019, which
(Continued)

(51) Int. Cl.
*B28B 11/00* (2006.01)
*B01D 46/24* (2006.01)
(Continued)

(52) U.S. Cl.
CPC ........ *B28B 11/007* (2013.01); *B01D 46/2459* (2013.01); *B01D 46/2482* (2021.08); *C04B 38/0012* (2013.01); *B01D 46/0001* (2013.01)

(58) Field of Classification Search
CPC ... B28B 11/006; B28B 11/007; B01D 46/244; B01D 46/2418; B01D 46/24491–24495;
(Continued)

(56) References Cited

U.S. PATENT DOCUMENTS 7,052,735 B2   5/2006  Nate et al.
7,537,634 B2   5/2009  Hatano et al.
(Continued)

FOREIGN PATENT DOCUMENTS

CN   1512972 A   7/2004
CN   1638846 A   7/2005
(Continued)

OTHER PUBLICATIONS

Machine English translation of Ivanova et al. (SU-1172720-A); retrieved from https://iq.ip.com/discover (Year: 1985).*
(Continued)

*Primary Examiner* — Francisco W Tschen
*Assistant Examiner* — Edgaredmanuel Troche
(74) *Attorney, Agent, or Firm* — Russell S. Magaziner

(57) ABSTRACT

A method of plugging channels of a honeycomb body and a honeycomb body including plugged channels. The method includes applying a shear force to a plugging mixture including a plurality of inorganic particles, clay, and a liquid vehicle to alter the viscosity of the plugging mixture from a first viscosity prior to the vibrating to a second viscosity which is less than the first viscosity. A honeycomb body is placed into contact with the plugging mixture such that a portion of the plugging mixture having the second viscosity flows into the plurality of channels. Application of the shear
(Continued)

force is stopped or reduced to increase the viscosity of the portion of the plugging mixture in the plurality of channels to greater than the first viscosity.

21 Claims, 16 Drawing Sheets

Related U.S. Application Data is a continuation of application No. PCT/US2019/044447, filed on Jul. 31, 2019, application No. 17/162,240 is a continuation of application No. PCT/US2019/044447, filed on Jul. 31, 2019.

(60) Provisional application No. 62/712,592, filed on Jul. 31, 2018.

(51) Int. Cl.
  *C04B 38/00* (2006.01)
  *B01D 46/00* (2022.01)

(58) Field of Classification Search
  CPC ............ B01D 46/2476; B01D 46/2478; B01D 46/248; C04B 38/0012; C04B 2111/00793; C04B 35/565; F01N 3/0222
  See application file for complete search history.

(56) References Cited

U.S. PATENT DOCUMENTS

| | | |
|---|---|---|
| 7,638,086 B2 | 12/2009 | To et al. |
| 8,052,911 B2 | 11/2011 | Ichikawa |
| 8,535,587 B2 | 9/2013 | Tokunaga |
| 10,450,914 B2 | 10/2019 | Suzuki et al. |
| 2003/0161945 A1 | 8/2003 | Allen et al. |
| 2004/0209039 A1 | 10/2004 | Ichikawa |
| 2004/0231307 A1* | 11/2004 | Wood ................. B01D 46/2429 55/523 |
| 2005/0272602 A1* | 12/2005 | Ninomiya ........... C04B 41/5089 502/202 |
| 2007/0182072 A1* | 8/2007 | Ichikawa .............. C04B 41/009 264/630 |
| 2007/0210485 A1 | 9/2007 | Hatano et al. |
| 2008/0006972 A1 | 1/2008 | Ichikawa |
| 2008/0197534 A1 | 8/2008 | Ichikawa |
| 2009/0011180 A1 | 1/2009 | Ichikawa |
| 2009/0252919 A1* | 10/2009 | Ogura ................ B01D 46/2455 428/116 |
| 2009/0283928 A1* | 11/2009 | Ito ......................... B28B 11/006 264/69 |
| 2017/0284245 A1* | 10/2017 | Suzuki .................. B28B 11/006 |

FOREIGN PATENT DOCUMENTS

| | | | | |
|---|---|---|---|---|
| CN | 101015933 A | 8/2007 | | |
| CN | 101311501 A | 11/2008 | | |
| CN | 101636252 A | 1/2010 | | |
| JP | 5061537 B2 | 10/2012 | | |
| JP | 5331636 B2 | 10/2013 | | |
| JP | 5416636 B2 | 2/2014 | | |
| SU | 1172720 A * | 8/1985 | ........... | B28B 11/006 |
| WO | WO-2009088079 A1 * | 7/2009 | ........... | B28B 11/006 |

OTHER PUBLICATIONS

Machine English translation of Tokunaga et al. (WO-2009088079-A1); retrieved from https://iq.ip.com/discover (Year: 2009).*
Chinese Patent Application No. 201980099079.9, Office Action dated Mar. 25, 2023, 5 pages (English Translation only), Chinese Patent Office.
JP5061537 B2 Machine translation, 2023.
JP5331636 B2 Machine translation, 2023.
JP5416636 B2 Machine translation, 2023.

* cited by examiner

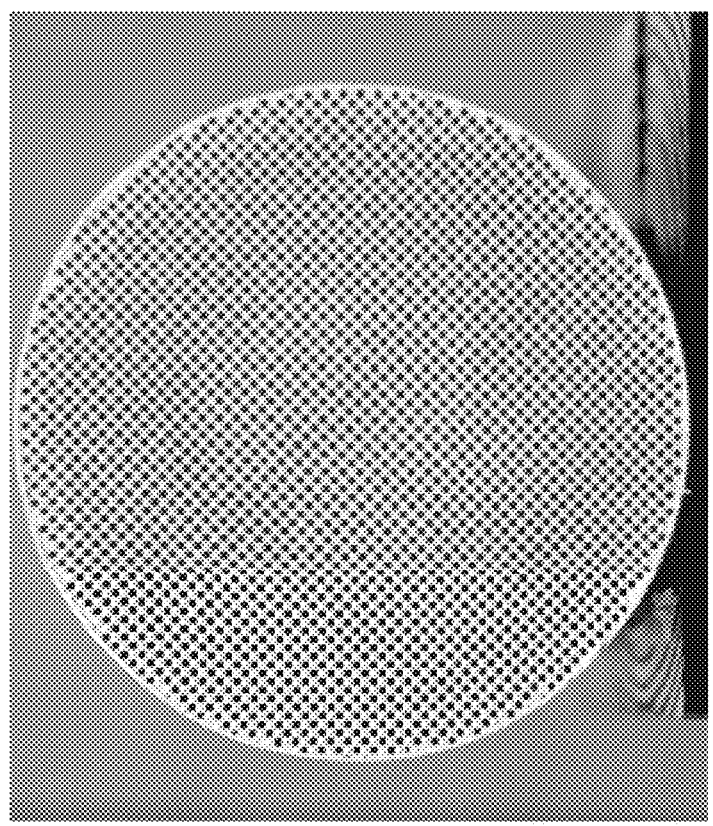
FIG. 7A
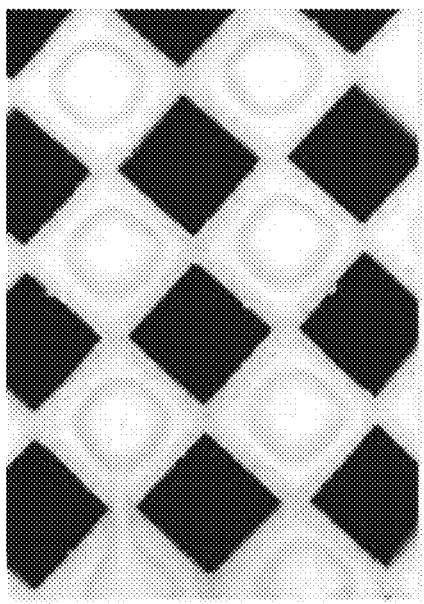
FIG. 7B
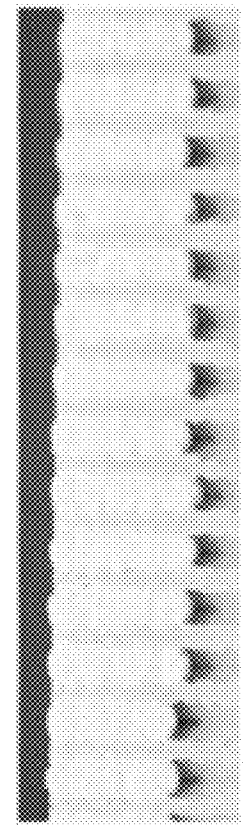
FIG. 7D
FIG. 7C

METHODS OF PLUGGING A HONEYCOMB BODY

CROSS-REFERENCE TO RELATED APPLICATIONS

This application is a continuation of International Patent Application Serial No. PCT/US2019/058752 filed on Oct. 30, 2019, which claims the benefit of priority to International Patent Application Serial No. PCT/US2019/044447 filed on Jul. 31, 2019, which claims the benefit of priority under 35 U.S.C. § 119 of U.S. Provisional Application Ser. No. 62/712,592 filed on Jul. 31, 2018, the content of which are incorporated herein by reference in their entireties. This application is also a continuation of International Patent Application Serial No. PCT/US2019/044447 filed on Jul. 31, 2019, which claims the benefit of priority under 35 U.S.C. § 119 of U.S. Provisional Application Ser. No. 62/712,592 filed on Jul. 31, 2018, the content of which are incorporated herein by reference in their entireties.

FIELD OF THE DISCLOSURE

The present disclosure generally relates to ceramic honeycomb bodies used as filters, and more specifically, to methods of plugging honeycomb bodies.

BACKGROUND

Ceramic wall flow filters typically have porous honeycomb structures with the plugs sealing alternate channels, which force exhaust gas flow through porous channel walls to exit from adjoining channels.

SUMMARY OF THE DISCLOSURE

In one aspect, a method of plugging channels of a honeycomb body comprising a plurality of channels is provided. The method comprises applying a shear force to a plugging mixture comprising a plurality of inorganic particles, an inorganic binder, clay, and a liquid vehicle to alter the viscosity of the plugging mixture from a first viscosity prior to the vibrating to a second viscosity which is less than the first viscosity; placing a honeycomb body into contact with the plugging mixture such that a portion of the plugging mixture having the second viscosity flows into the plurality of channels; and reducing or stopping application of the shear force to increase the viscosity of the portion of the plugging mixture in the plurality of channels to greater than the first viscosity.

In some embodiments, the clay comprises a plurality of clay platelets each comprising positively charged portions and negatively charged portions, and wherein the viscosity is decreased due to the shear force breaking polar bonds formed between the positively charged portions of the clay platelets and the negatively charged portions of adjacent clay platelets. In some embodiments, the clay comprises smectite clay.

In some embodiments, applying the shear force to the plugging mixture comprises vibrating the plugging mixture. In some embodiments, vibrating the plugging mixture comprises vibrating the plugging mixture according to a vibration profile having a plurality of different frequencies, a plurality of different amplitudes, or both. In some embodiments, vibrating the plugging mixture comprises variably transitioning from a first combination of one or more frequencies and amplitudes to a second combination of one or more frequencies and amplitudes.

In some embodiments, the plugging mixture is vibrated along at least two axes. In some embodiments, the plugging mixture is vibrated at different frequencies along each of the at least two axes. In some embodiments, wherein the plugging mixture is vibrated at different vibrational amplitudes along each of the at least two axes.

In some embodiments, the plugging mixture is vibrated at a frequency of from about 1 Hz to about 10,000 Hz. In some embodiments, the plugging mixture is vibrated at a frequency of from about 10 Hz to about 500 Hz. In some embodiments, the vibrating is conducted such that the plugging mixture is vibrated at a vibrational amplitude of from about 0.1 G to about 50 G. In some embodiments, the vibrating is conducted such that the plugging mixture is vibrated at a vibrational amplitude of from about 0.5 G to about 10 G.

In some embodiments, the plugging mixture is vibrated with a square wave vibration profile. In some embodiments, the plugging mixture is vibrated with a triangle wave vibration profile. In some embodiments, the plugging mixture is vibrated with a sine wave vibration profile.

In some embodiments, the plugging mixture is disposed in a receptacle before placing the honeycomb body into contact with the plugging mixture, and wherein a remaining portion of the plugging mixture remains in the receptacle when application of the shear force is stopped or reduced.

In some embodiments, comprising, after removing the honeycomb body from the plugging mixture, applying the shear force to the remaining portion of the plugging mixture to return the viscosity of the remaining portion of the plugging mixture back toward the second viscosity; placing a subsequent honeycomb body into contact with the remaining portion of the plugging mixture such that a portion of the plugging mixture flows into channels of the subsequent honeycomb body; reducing or stopping application of the shear force to increase the viscosity of the portion of the plugging mixture in channels of the subsequent honeycomb body to greater than the first viscosity.

In some embodiments, the clay comprises colloidal clay. In some embodiments, the plugging mixture is flowable into the channels at the second viscosity. In some embodiments, a value of the first viscosity is about 400% or greater of that of the second viscosity. In some embodiments, a value of the first viscosity is about 1000% or greater of that of the second viscosity.

In some embodiments, the first viscosity is about 25,000 cP or greater and the second viscosity is about 15,000 cP or less. In some embodiments, the first viscosity is about 75,000 cP or greater and the second viscosity is about 10,000 cP or less.

In some embodiments, the method further comprises placing a mask layer into contact with a first end of the honeycomb body to cover at least some of the plurality of channels before placing the honeycomb body into contact with the plugging mixture.

In some embodiments, the method further comprises forming a hole in the mask layer proximate at least one of the plurality of channels, wherein the hole has an area of about 80% or less of a cross-sectional area of the channel proximate the hole. In some embodiments, the hole has an area of about 30% or less of the cross-sectional area of the channel proximate the hole.

In another aspect, a honeycomb body is provided. The honeycomb body comprises a honeycomb structure comprising a plurality of intersecting walls defining a plurality of channels extending through the honeycomb body from a first end to a second end; and a plurality of plugs disposed within at least some of the channels at either the first or second end of the honeycomb body, wherein the plugs comprise: a smectite clay; an inorganic binder; and a plurality of inorganic particles, and wherein a standard deviation in length of the plugs is 2 mm or less.

In some embodiments, each of the plugs have the standard deviation in length is 1 mm or less. In some embodiments, the plurality of inorganic particles comprises cordierite.

These and other features, advantages, and objects disclosed herein will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 7A is an image of a wall-flow particulate filter including a plurality of plugs, according to a first example;

FIG. 7B is an enhanced image of the plugs of the particulate filter of FIG. 7A;

FIG. 7C is a cross-sectional image of the particulate filter of FIG. 7A illustrating plug depth uniformity;

FIG. 7D is an image depicting wall adhesion of the plugs to walls of the wall flow particulate filter of FIG. 7A;

DETAILED DESCRIPTION

Figure 1:
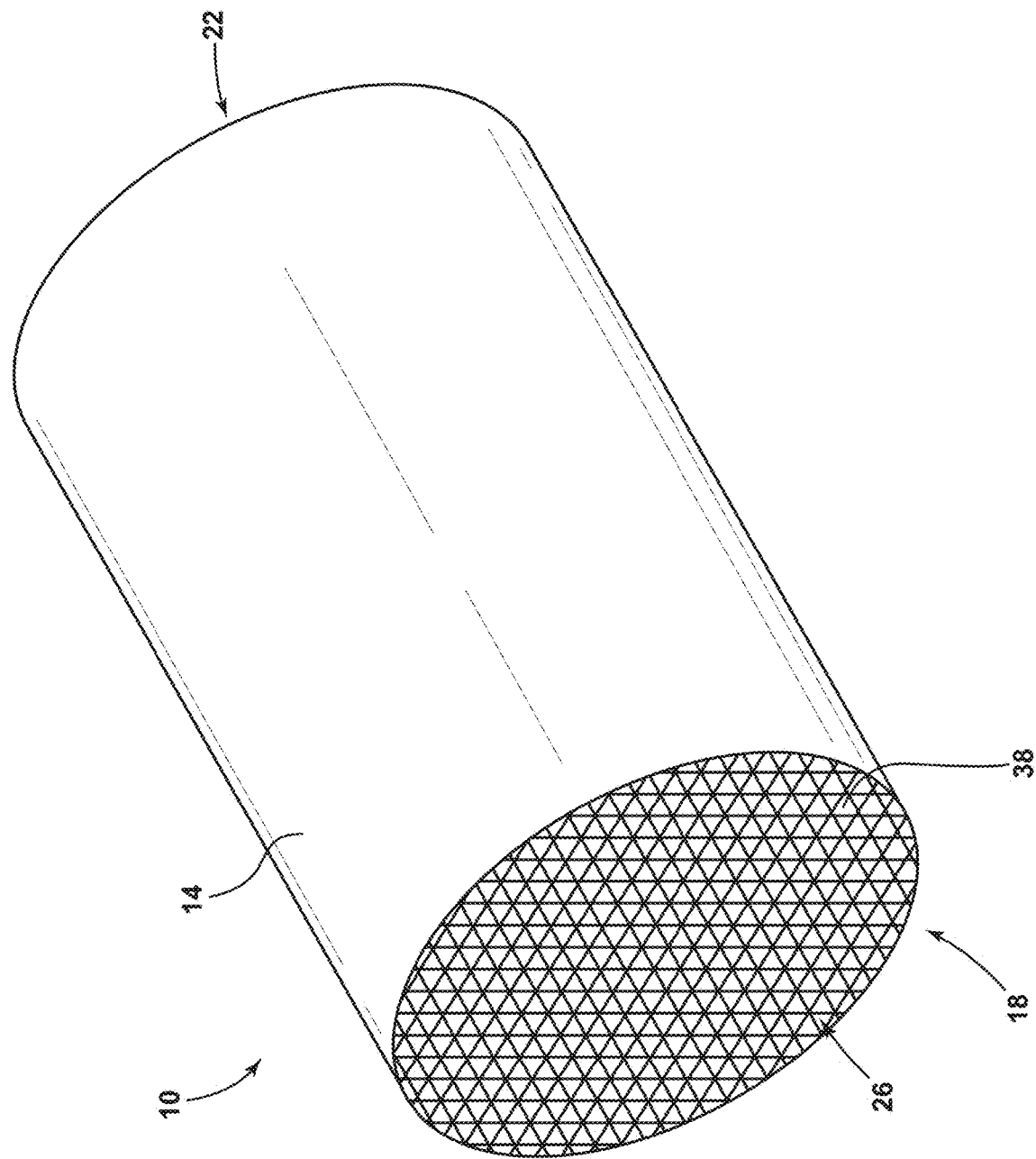
FIG. 1 is a perspective view of a filter, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The construction and arrangement of the elements of the present disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Figure 2:
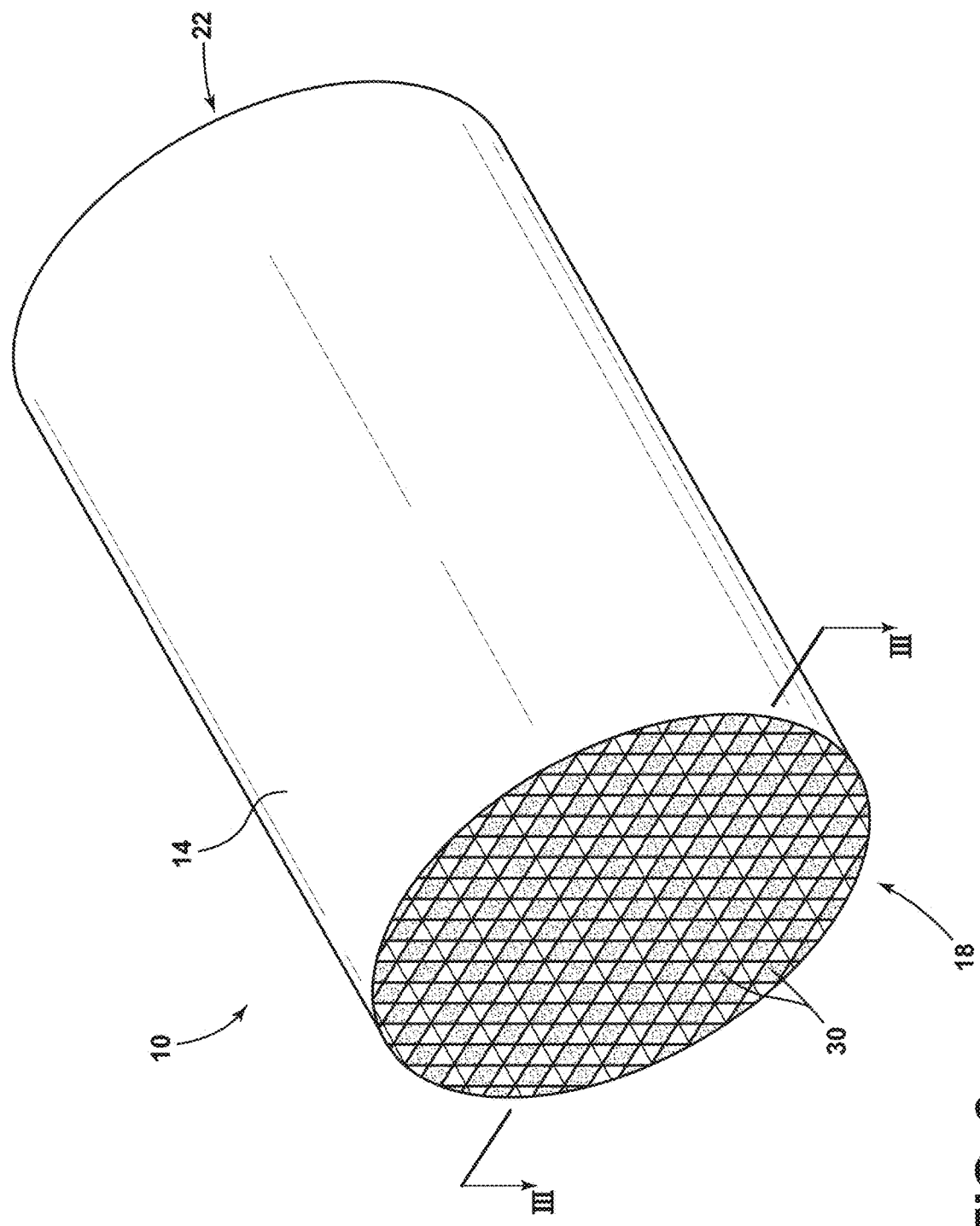
FIG. 2 is a perspective view of the filter including a plurality of plugs, according to at least one example.

FIGS. 1 and 2 show a filter 10 comprising a honeycomb body 14 comprising a first end 18 and a second end 22. The honeycomb body 14 comprises intersecting cell walls that form a plurality of channels 26 extending from the first end 18 to the second end 22. According to various examples, filter 10 comprises a plurality of plugs 30 positioned within at least some of the channels 26, in some embodiments at first and second ends 18, 22, of the honeycomb body 14.

Referring now to FIG. 1, the honeycomb body 14 comprises a matrix of intersecting cell walls comprise thin, porous walls 38 which extend across and between the first and second ends 18, 22 to form a large number of adjoining channels 26. The channels 26 extend between and are open at the first and second ends 18, 22 of the honeycomb body 14. According to various examples, the channels 26 are mutually parallel with one another. The honeycomb body 14 may comprise a transverse cross-sectional channel density of from about 10 channels/in$^2$ to about 900 channels/in$^2$, or from about 20 channels/in$^2$ to about 800 channels/in$^2$, or from about 30 channels/in$^2$ to about 700 channels/in$^2$, or from about 40 channels/in$^2$ to about 600 channels/in$^2$, 50 channels/in$^2$ to about 500 channels/in$^2$, or from about 60 channels/in$^2$ to about 400 channels/in$^2$, or from about 70 channels/in$^2$ to about 300 channels/in$^2$, or from about 80 channels/in$^2$ to about 200 channels/in$^2$, or from about 90 channels/in$^2$ to about 100 channels/in$^2$, or form about or from about 100 channels/in$^2$ to about 200 channels/in$^2$ or any and all values and ranges therebetween. The walls 38 may have a thickness in mils (i.e., thousands of an inch) of from about 1 mil to about 15 mils, or from about 1 mil to about 14 mils, or from about 1 mil to about 13 mils, or from about 1 mil to about 12 mils, or from about 1 mil to about 11 mils, or from about 1 mil to about 10 mils, or from about 1 mil to about 9 mils, or from about 1 mil to about 8 mils, or from about 1 mil to about 7 mils, or from about 1 mil to about 6 mils, or from about 1 mil to about 5 mils, or from about 1 mil to about 4 mils, or from about 1 mil to about 3 mils, or from about 1 mil to about 2 mils or any and all values and ranges therebetween. It will be understood that although the channels 26 are depicted with a generally square cross-sectional shape, the channels 26 may have a circular, triangular, rectangular, pentagonal or higher order polygon cross-sectional shape without departing from the teachings provided herein.

The honeycomb body 14 may be formed of a variety of materials including ceramics, glass-ceramics, glasses, metals, and by a variety of methods depending upon the material selected. According to various examples, a green body which is transformed into the honeycomb body 14 may be initially fabricated from plastically formable and sinterable finely divided particles of substances that yield a porous material after being fired. Suitable materials for a green body which is formed into the honeycomb body 14 comprise metallics, ceramics, glass-ceramics, and other ceramic based mixtures. In some embodiments, the honeycomb body 14 is comprised of a cordierite (e.g., $2MgO \cdot 2Al_2O_3 \cdot 5SiO_2$) material.

Referring to FIG. 2, the filter 10 can be formed from the honeycomb body 14 by closing or sealing a first subset of channels 26, such as at the first end 18 with plugs 30, and the remaining channels 26 (for example alternating channels 26) being closed at the second end 22 of the honeycomb body 14, using other plugs 30. The plugs 30 can be formed by filling a portion of at least some of the channels 26 with a plugging mixture and then drying or curing the mixture. In operation of the filter 10, fluids such as gases carrying solid particulates are brought under pressure to the inlet face (e.g., the first end 18). The gases then enter the honeycomb body 14 via the channels 26 which have an open end at the first end 18, pass through the walls 38 of the porous cell walls, and out the channels 26 which have an open and at the second end 22. Passing of the gasses through the walls 38 may allow the particulate matter in the gases to remain trapped by the walls 38.

Figure 3:
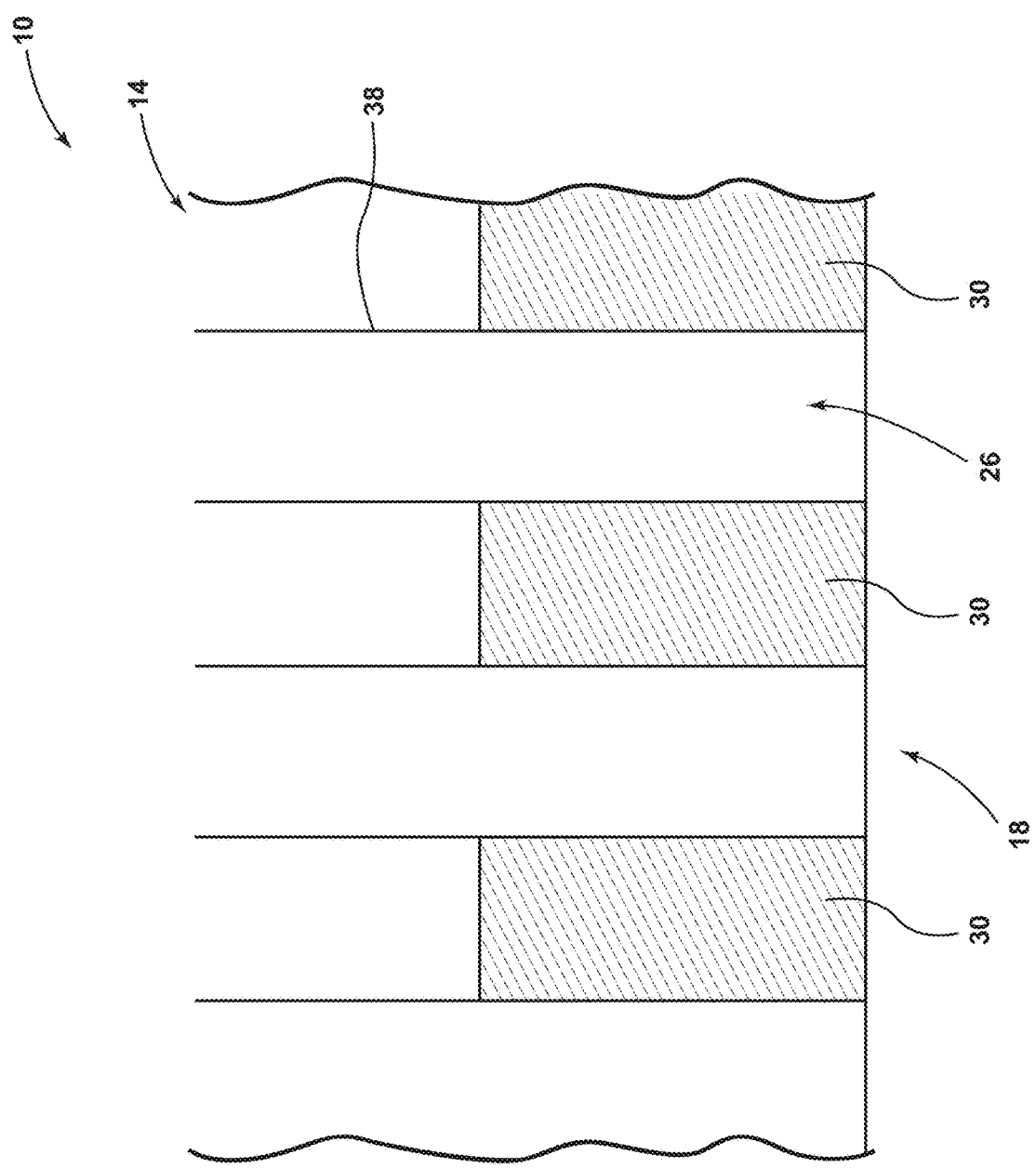
FIG. 3 is a cross-sectional view taken at line III of FIG. 2, according to at least one example.

As schematically illustrated in FIGS. 2 and 3, plugs 30 may be positioned in the channels 26 in an alternating manner. In the depicted example, the plugs 30 are positioned across the first and second ends 18, 22 of the honeycomb body 14 in a "checkerboard" pattern, but it will be understood that other patterns may also be applied. In the checkerboard pattern, each of an open channel's 26 nearest neighbor channels 26 on an end (e.g., either the first or second end 18, 22) includes a plug 30.

The plugs 30 may have an axial length, or longest dimension extending substantially parallel with the channels 26, of about 0.5 mm or greater, of about 1 mm or greater, of about 1.5 mm or greater, of about 2 mm or greater, of about 2.5 mm or greater, of about 3 mm or greater, of about 3.5 mm or greater, of about 4 mm or greater, of about 4.5 mm or greater, of about 5 mm or greater, of about 5.5 mm or greater, of about 6.0 mm or greater, of about 6.5 mm or greater. For example, the plugs 30 may have an axial length of from about 0.5 mm to about 10 mm, or from about 1 mm to about 9 mm, or from about 1 mm to about 8 mm, or from about 1 mm to about 7 mm, or from about 1 mm to about 6 mm, or from about 1 mm to about 5 mm, or from about 1 mm to about 4 mm, or from about 1 mm to about 3 mm, or from about 1 mm to about 2 mm or any and all value and ranges therebetween. According to various examples, the plurality of plugs 30 located on the first end 18 of the body 14 may have a different length than the plugs 30 positioned on the second end 22 of the body 14.

The variation in length for a plurality of plugs 30 may be expressed as a standard deviation and is calculated as the square root of variance by determining the variation between each length relative to the average length of the plugs 30. The standard deviation of the plurality of plugs 30 is a measure of the variance in the length of plugs 30 positioned, for example, on either the first or second ends 18, 22 of the honeycomb body 14. All of the plurality of plugs 30 on one end (e.g., the first or second end 18, 22) may have a standard deviation in length of from about 0.1 mm to about 3.0 mm. For example, a standard deviation in length of the plugs 30 may be about 3.0 mm or less, about 2.9 mm or less, about 2.8 mm or less, about 2.7 mm or less, about 2.6 mm or less, about 2.5 mm or less, about 2.4 mm or less, about 2.3 mm or less, about 2.2 mm or less, about 2.1 mm or less, about 2.0 mm or less, about 1.9 mm or less, about 1.8 mm or less, about 1.7 mm or less, about 1.6 mm or less, about 1.5 mm or less, about 1.4 mm or less, about 1.3 mm or less, about 1.2 mm or less, about 1.1 mm or less, about 1.0 mm or less, about 0.9 mm or less, about 0.8 mm or less, about 0.7 mm or less, about 0.6 mm or less, about 0.5 mm or less, about 0.4 mm or less, about 0.3 mm or less, about 0.2 mm or less, about 0.1 mm or less or any and all values and ranges therebetween. According to various examples, the plurality of plugs 30 located on the first end 18 of the body 14 may have a different standard deviation than the plugs 30 positioned on the second end 22 of the body 14.

As inserted into body 14, plugs 30 may be comprised of a clay, an inorganic binder and a plurality of inorganic particles. In some embodiments, the inorganic particles comprise the inorganic binder and/or are otherwise the same material or combination of materials. However, the clay is in addition to one or more inorganic materials of the inorganic binder and/or inorganic particles. Plugs 30 may further comprise one or more additives (e.g., rheology modifiers, plasticizers, organic binders, etc.). It will be understood that the composition of the plurality of plugs 30 as inserted may vary across the body 14. For example, the plurality of plugs 30 of the first or second end 18, 22 may vary or the composition may vary between the first and second ends 18, 22 of the body 14.

The clay may comprise one or more colloidal clays and/or smectite clays. Smectite is the name used for a group of phyllosilicate mineral clays. Exemplary smectite clays may comprise Veegum® clay (magnesium aluminum silicate), montmorillonite, beidellite, nontronite, saponite and/or hectorite. Smectite clays have a variable net negative charge, which is balanced by Na, Ca, Mg and/or H adsorbed externally on interlamellar surfaces. The structure, chemical composition, exchangeable ion type and small crystal size of smectite clays are responsible for several unique properties, including a large chemically active surface area, a high cation exchange capacity, interlamellar surfaces having hydration characteristics, and rheological modifications of liquids. Other classes and types of clays such as kaolinite, illite, and chlorite may be utilized additionally or alternatively to smectite clays.

Figure 4:
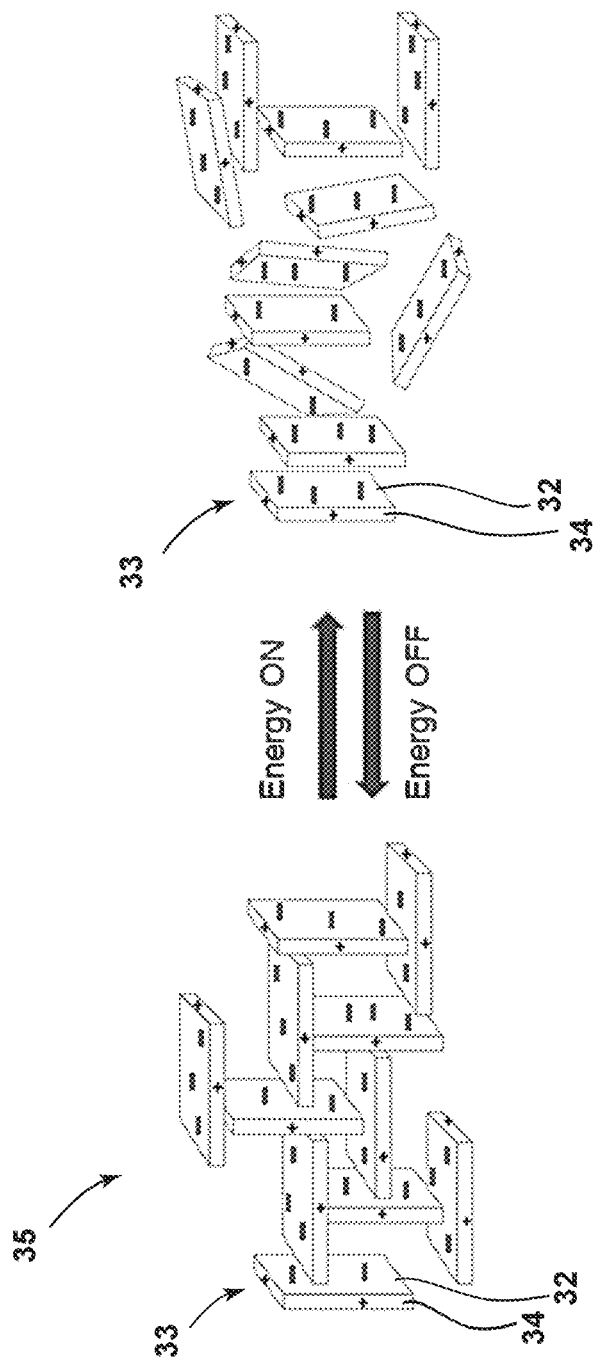
FIG. 4 is a schematic view of a behavior of clay platelets of a plugging material upon applying and removing external energy according to one embodiment disclosed herein.

In some embodiments, the clay in the plugging mixture used to form the plugs 30, e.g., smectite clay, may have a structure of clay platelet layers. In some embodiments, the clay platelets are several hundred nanometers in width, but only up to several (e.g., one) nanometers in thickness. As illustrated in FIG. 4, faces 32 of platelets 33 carry negative charges while edges 34 of the platelets 33 are positively charged (i.e., the platelets have a polar charge). When water (or other liquid vehicle) penetrates between platelets during a hydration process, the platelets may delaminate from one another, which enables relative motion of the platelets to one another. As the positively charged edges 34 of the platelets are attracted to, and form electrostatic bonds with, the negatively charged faces 32 of adjacent platelets, a three-dimensional structure 35 of platelets having a greater volume than non-hydrated clay may be formed. One could refer to such a three-dimensional structure as a "house of cards" structure. Thus in some embodiments, as the clay of the plugs 30 is hydrated, the colloidal house of cards structure assembles quickly (e.g., by the platelets delaminating and then rearranging due to the attraction between the negatively charged faces and positively charged edges) to increase the viscosity of the hydrated clay. Due to the charged bonding nature of these clay platelets, external energy (e.g., applying a shear force such as by vibrating or mixing the plugging mixture that contains the hydrated clay) applied to the hydrated clay may cause the structure to collapse such that the viscosity of the hydrated clay reduces within seconds. In other words, upon the application of external energy (e.g., applying a shear force such as by vibrating or mixing the plugging mixture that contains the hydrated clay), the electrostatic bonds between the platelets may be broken and allow the platelets to slide past one another thereby decreasing the viscosity of the hydrated clay.

The plugging mixture forming the plugs 30 as inserted into the body 14 may comprise an inorganic binder and/or a plurality of inorganic particles. The inorganic binder may comprise silica, alumina, other inorganic binders and combinations thereof. The silica may be in the form of fine amorphous, nonporous silica particles, in some embodiments preferably generally spherical silica particles. At least one commercial example of suitable colloidal silica for the manufacture of the plugs 30 is produced under the name Ludox®. The inorganic particles of the plugs 30 may be comprised of glass material, ceramic material such as cordierite, glass-ceramic material, and/or combinations thereof. In some embodiments, the inorganic particles comprise the inorganic binder and/or the materials of the inorganic particles and the inorganic binder are the same, while the clay is separate from the inorganic materials of the inorganic particles and/or the inorganic binder. In some embodiments, the inorganic particles may have the same or a similar composition to that of the green body that is used to produce the honeycomb body 14. In some embodiments, the inorganic particles comprise cordierite or cordierite forming precursor materials which, upon reactive sintering or sintering, form a porous ceramic structure.

Figure 5A:
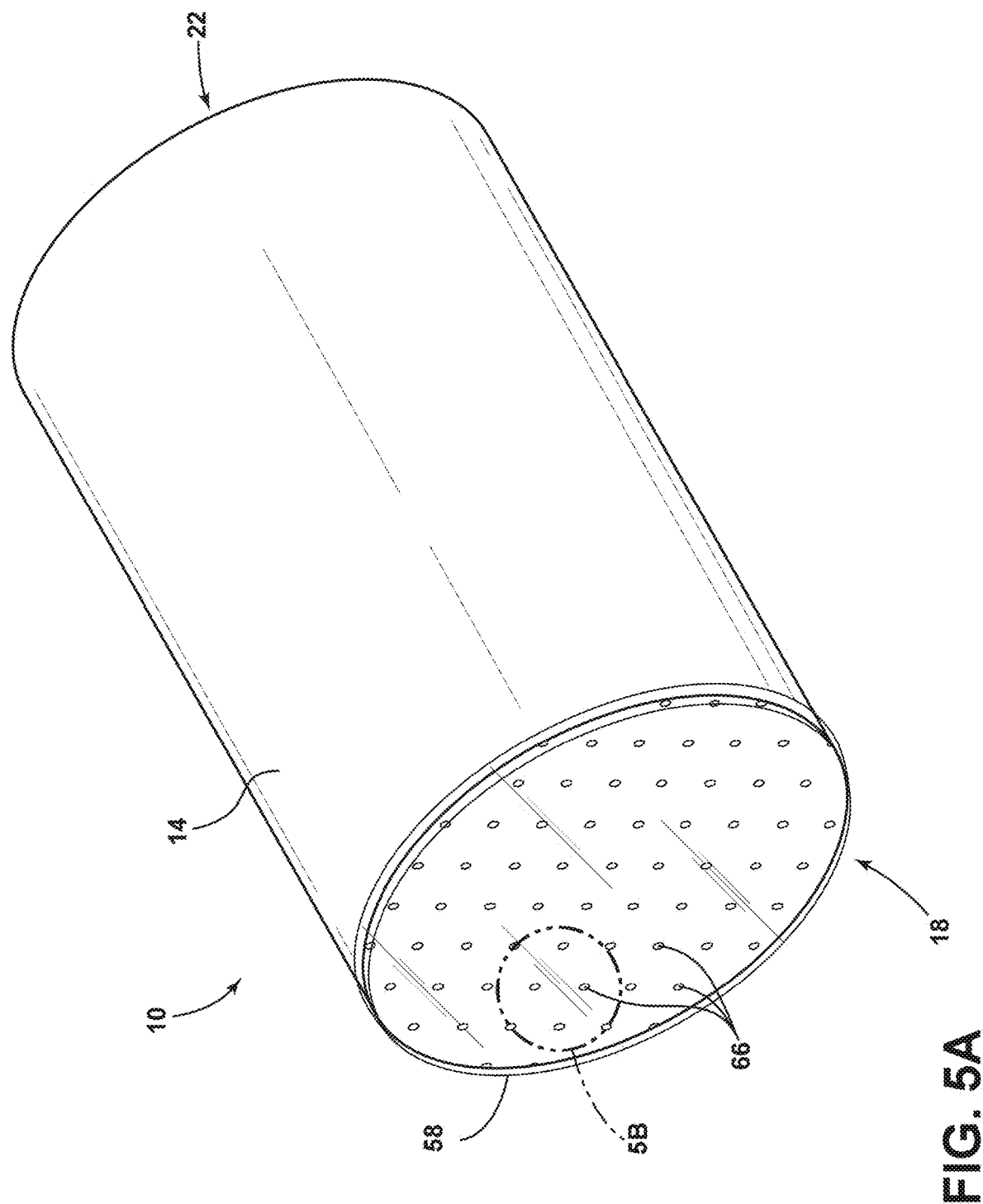
FIG. 5A is a perspective view of the filter including a mask layer, according to at least one example.
Figure 5B:
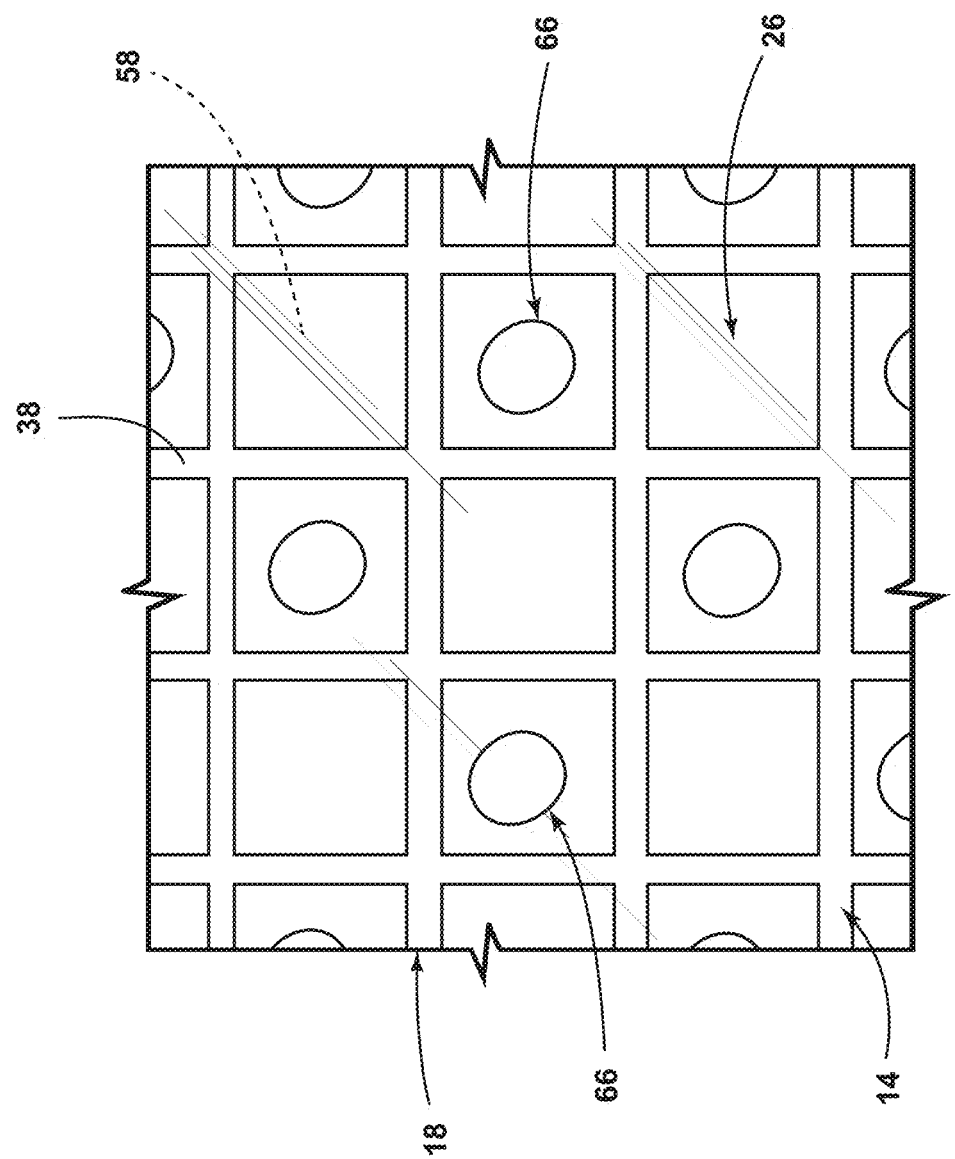
FIG. 5B is an enhanced view taken at section 5B of FIG. 5A, according to at least one example.
Figure 6:
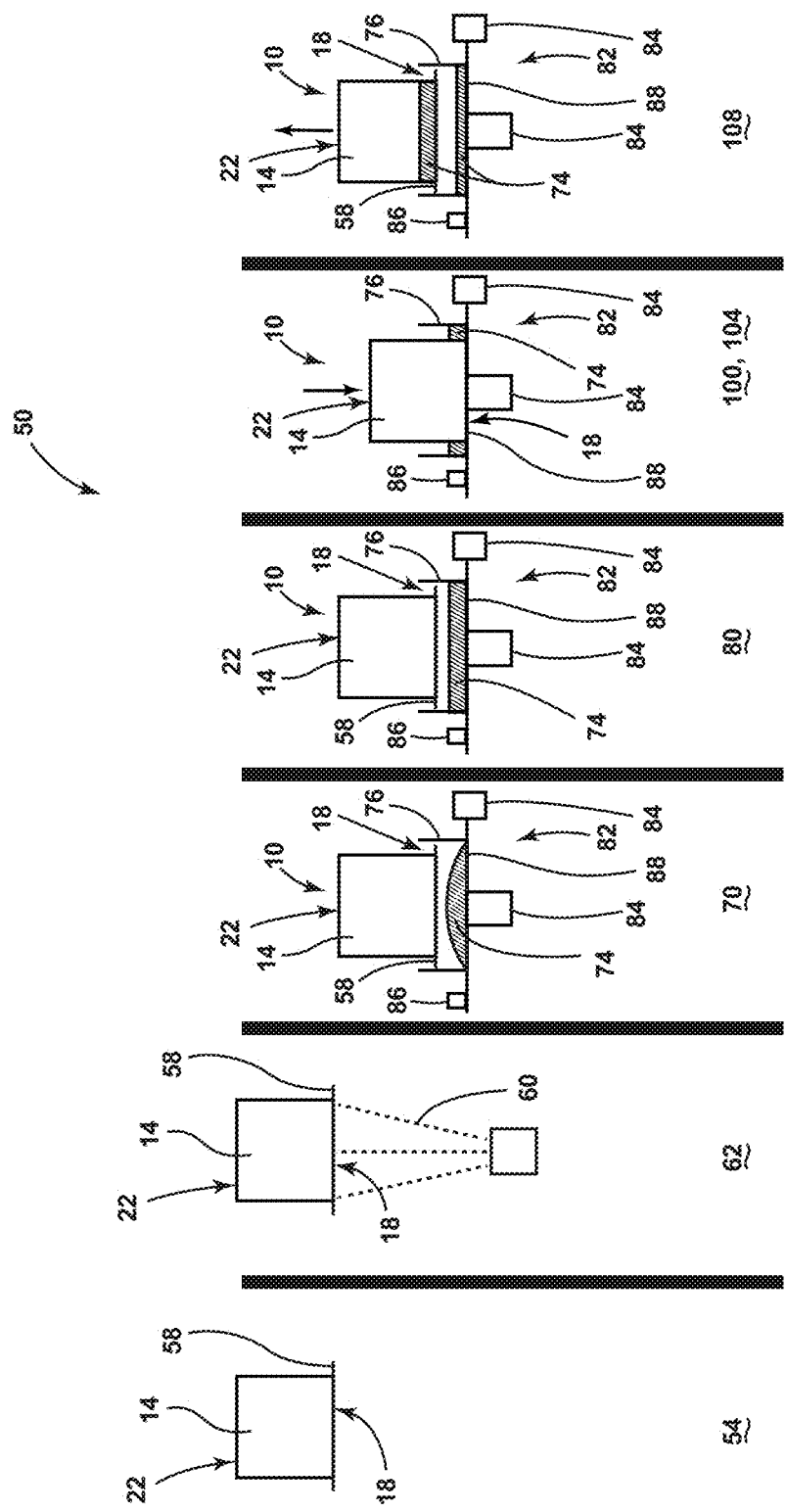
FIG. 6 is a schematic flowchart of a method, according to at least one example.

Referring now to FIGS. 5A-6, the filter 10 may be formed using a mask layer 58 across the first end 18 of the honeycomb body 14 to cover the plurality of filter channels 26. The mask layer 58 may be comprised of a metal, polymer, a composite material and/or combinations thereof. For example, the mask layer 58 may be comprised of a rice paper, cellophane, plexiglass, biaxially-oriented polyethylene terephthalate, other materials and/or combinations thereof. A mask layer 58 can be positioned on the first and/or second ends 18, 22 of the honeycomb body 14. The mask layer 58 may cover a portion, a majority, substantially all or all of the first and/or second ends 18, 22. The mask layer 58 may have the same size and shape as the first and/or second ends 18, 22, or the size and/or shape of the mask layer 58 may be different. For example, the mask layer 58 may have the same general shape as a cross-section of the honeycomb body 14 (e.g., generally circular) and may have a greater diameter than the honeycomb body 14 such that the mask layer 58 extends radially outwardly from the honeycomb body 14. The mask layer 58 may extend outwardly from the honeycomb body 14 about 0.5 cm or greater, about 1.0 cm or greater, about 1.5 cm or greater, about 2.0 cm or greater, about 2.5 cm or greater, about 3.0 cm or greater, about 3.5 cm or greater, about 4.0 cm or greater, about 4.5 cm or greater, about 5.0 cm or greater, about 5.5 cm or greater, about 6.0 cm or greater or any and all values and ranges therebetween. The mask layer 58 may be coupled to the honeycomb body 14. For example, the honeycomb body 14 and/or mask layer 58 may have an adhesive adhered thereto, or disposed between, to allow sticking of the mask layer 58 to the honeycomb body 14. In another example, a band may be positioned around an exterior surface of the honeycomb body 14 to retain the mask layer 58 to the honeycomb body 14. The mask layer 58 may be placed on the honeycomb body 14 at the beginning of a method 50. As such, method 50 may begin with a step 54 of placing the mask layer 58 into contact with the first end 18 of the honeycomb body 14 to cover at least some of the plurality of channels 26 before placing the honeycomb body 14 into contact with a plugging mixture 74.

Next, a step 62 of forming a hole 66 in the mask layer 58 proximate one of the plurality of channels 26 is performed. The hole 66 facilitates fluid communication between the channel 26 and an environment on the other side of the mask layer 58. The hole 66 may be formed through mechanical force (e.g., with a punch) or by a laser 60. According to various examples, the mask layer 58 may include a plurality of holes 66 positioned across the mask layer 58. For example, the holes 66 may be positioned in a pattern (e.g., a checkerboard-like pattern) across the mask layer 58. In checkerboard-like patterns, the holes 66 are positioned over every other channel 26 at a face (e.g., the first and/or second ends 18, 22). According to various examples, a plurality of holes 66 may be positioned over a plurality of the channels 26.

The holes 66 may take a variety of shapes. For example, the holes 66 may have a circular, oval, oblong, triangular, square, rectangular or higher order polygon shape. The holes 66 may have an area of from about 1% to about 80% of a cross-sectional area of the corresponding respective channel 26 aligned with the hole 66. For example, the holes 66 may have an area of about 80% or less, about 75% or less, about 70% or less, about 65% or less, about 55% or less, about 50% or less, about 45% or less, about 40% or less, about 35% or less, about 30% or less, about 25% or less, about 20% or less, about 15% or less, about 10% or less, about 5% or less of a cross-sectional area of the channel 26 proximate the holes 66. It will be understood that any and all values and ranges therebetween are contemplated. Use of the term aligned is meant to mean that the holes 66 may be positioned in a variety of locations over the channels 26 to allow fluid communication of the plugging mixture 74 through the hole 66 and into the channel 26. For example, the holes 66 may be positioned in a middle, a side, or around edges of the channels 26. Further, it will be understood that two or more holes 66 may be positioned proximate each channel 26.

A plugging mixture 74 having a first viscosity is provided or formed in a step 70 and may comprise a plurality of inorganic particles, an inorganic binder, clay and a liquid vehicle such as water (it to be appreciated that references to water herein could be replaced by other suitable liquid vehicle). In some embodiments, the plugging mixture advantageously does not include (is free of or substantially free of) any organic components, such as methylcellulose or other organic binders. The plugging mixture 74 may be disposed in a receptacle 76 before being placed in contact with the honeycomb body 14. The plugging mixture 74 may be formed and/or provided as a slurry or bath or other volumetric quantity sufficient to cause the plugging mixture 74 to enter one or more channels 26 when the plugging mixture 74 is brought into contact with the filter 10. In some embodiments, the plugging mixture 74 may have substantially the same composition as the resulting plugs 30 (after the heating, curing, drying, calcining, or other process or condition) wherein the plugging mixture 74 may comprise water and/or one or more fugitive materials (e.g., a binder, rheology modifier, organic component, etc.). As explained above, the clay present in the plugging mixture 74 and in the resulting plugs 30 may comprise a clay, e.g., a smectite clay, that transitions from a viscosity to a relatively lower viscosity upon application of external energy (e.g., by applying a shear force such as by vibrating or mixing the plugging mixture 74). Preferably, the plugging mixture 74 is capable of being formed at a first viscosity and reversibly transitioned, or altered, to a second viscosity.

Advantageously, the reduction in viscosity of the plugging material 74 (e.g., by vibration or other source of applied shear force) facilitates the ability of plugging mixture 74 to more readily (i.e., more quickly, consistently, and/or reliably) flow into the channels 26 of the honeycomb body 14. In some embodiments, the holes 66 in the mask layer 58 are smaller than the size of the channels 26 (e.g., to facilitate alignment of the holes 66 with only corresponding ones of the channels 26 even if the mask layer 58 is misaligned to some degree with respect to the respective end face 18, 22 of the honeycomb body 14), thereby providing a further restriction to flow of the plugging material 74. Thus, the reduction in viscosity also increases the ability that (and improves the speed at which) the plugging mixture 74 flows through the holes 66 and into the channels 26 to a target or desired plug depth.

The inorganic particles may be introduced into the plugging mixture 74 as a grog (i.e., a suspension of the inorganic particles in a liquid, e.g., water) and/or as a dry additive. The inorganic particles may be comprised of a glass material, a ceramic material such as cordierite, glass-ceramic material, and/or combinations thereof. Depending on the particle size distribution of the inorganic particles, the inorganic particles may have a weight percentage in the plugging mixture 74 of from about 45% to about 80%, or from 50% to about 70%. For example, the inorganic particles may have a weight percentage in the plugging mixture 74 of about 50%, about 52%, about 54%, about 56%, about 58%, about 60%, about 62%, about 62.5%, about 63%, about 64%, about 66%, about 68%, about 70% or any and all values and ranges therebetween.

The inorganic binder of the plugging mixture 74 may comprise colloidal silica, colloidal alumina, colloidal binders and/or combinations thereof. The inorganic binder may have a weight percentage in the plugging mixture 74 of from about 10% to about 35%, or from about 10% to about 30%, or from about 10% to about 29%, or from about 10% to about 28%, or from about 10% to about 27%, or from about 10% to about 26%, or from about 10% to about 25%, or from about 10% to about 24%, or from about 10% to about 23%, or from about 10% to about 22%, or from about 10% to about 21%, or from about 10% to about 20% or from about 10% to about 19%, or from about 10% to about 18%, or from about 10% to about 17%, or from about 10% to about 16%, or from about 10% to about 15%. For example, the inorganic binder may have a weight percentage in the plugging mixture of about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35% or any and all values and ranges therebetween. At least one commercial example of suitable colloidal silica which may be used as the inorganic binder for the plugging mixture 74 may include Ludox®.

For smectite and/or colloidal clay in the plugging mixture 74, the clay may have a weight percentage in the plugging mixture 74 of from about 0.1% to about 5%, or from about 0.1% to about 2.0%, or from about 0.1% to about 1.9%, or from about 0.1% to about 1.8%, or from about 0.1% to about 1.7%, or from about 0.1% to about 1.6%, or from about 0.1% to about 1.5%, or from about 0.1% to about 1.4%, or from about 0.1% to about 1.3%, or from about 0.1% to about 1.2%, or from about 0.1% to about 1.1%, or from about 0.1% to about 1.0%, or from about 0.1% to about 0.9%, or from about 0.1% to about 0.8%, or from about 0.1% to about 0.7%, or from about 0.1% to about 0.6%, or from about 0.1% to about 0.5%, or from about 0.1% to about 0.4%, or from about 0.1% to about 0.3%, or from about 0.1% to about 0.2%, or from about 0.1% to about 1.1%, or from about 0.1% to about 1.0%, or from about 0.5% to about 0.75%. For example the clay may have a weight percentage in the plugging mixture 74 of about 0.10%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, about 0.95%, about 1.0%, about 1.10%, about 1.15%, about 1.2%, about 1.25%, about 1.3%, about 1.35%, about 1.4%, about 1.45%, about 1.5%, about 1.55%, about 1.6%, about 1.65%, about 1.7%, about 1.75%, about 1.8%, about 1.85%, about 1.9%, about 1.95%, about 2.0% or any and all values and ranges therebetween.

The plugging mixture 74 may comprise water to hydrate the clay. According to various examples, the water may be deionized. The water of the plugging mixture 74 may be added with the inorganic particles in grog examples and/or may be a separate addition. The plugging mixture 74 may comprise a weight percentage of water from about 5% to about 35% water, or from about 10% to about 25%, or from about 10% to about 24%, or from about 10% to about 23%, or from about 10% to about 22%, or from about 10% to about 21%, or from about 10% to about 20%, or from about 10% to about 19%, or from about 10% to about 18%, or from about 10% to about 17%, or from about 10% to about 16%, or from about 10% to about 15%, or from about 10% to about 14%, or from about 10% to about 13%, or from about 10% to about 12%, or from about 10% to about 11%. For example, the water may have a weight percentage in the plugging mixture 74 of about 10%, about 12%, about 14%, about 16%, about 18%, about 18.19%, about 20%, about 22%, about 24%, about 26%, about 28%, about 30%, about 31%, about 32%, about 33%, about 34%, about 35%, or any and all values and ranges therebetween. The clay may be hydrated by the water at an elevated temperature (e.g., from about 60° C. to about 80° C.) using a mixer. For example, the clay may be hydrated using a mixer running at about 4,000 revolutions per minute or greater (e.g., 6,000 revolutions per minutes). The clay may be hydrated for a time period of from about 0.1 minutes to about 40 minutes. As will be explained in greater detail below, the excess addition of water to the plugging mixture 74 may affect the creation of voids and dimples in the resulting plugs 30. Further, the ratio of water to clay or inorganic particles may also affect the depth of penetration of the plugging mixture 74 into the channels 26, and thereby the length of the plugs 30. Table 1 provides an exemplary composition of the plugging mixture 74.

TABLE 1

| Materials | Weight Percentage |
| --- | --- |
| Cordierite Particles | 62.50% |
| Colloidal Silica | 18.75% |
| Clay | 0.56% |
| Deionized Water | 18.19% |
| Total | 100.00% |

The plugging mixture 74 may be formed at a first viscosity. The first viscosity of the plugging mixture 74 may have a dynamic viscosity of from about 25,000 cP to about 1,000,000 cP, or from about 40,000 cP to about 700,000 cP, or from about 60,000 cP to about 600,000 cP, or from about 70,000 cP to about 500,000 cP, or from about 80,000 cP to about 400,000 cP, or from about 90,000 cP to about 300,000 cP, or from about 100,000 cP to about 200,000 cP, or any and all values and ranges therebetween. According to various examples, the first viscosity may be about 25,000 cP or greater (e.g., up to about 1,000,000 cP). It will be understood that the dynamic viscosity of the plugging mixture 74 is measured while the constituents of the plugging mixture 74 are in suspension prior to any settling that may occur. The first viscosity of the plugging mixture 74 is measured using a Brookfield viscometer while the constituents of the plugging mixture 74 are in suspension.

According to various examples, the plugging mixture 74 may comprise one or more deflocculants and a predetermined, or designed, inorganic particle sized. For purposes of this disclosure, the term "deflocculant" denotes a substance which, when added to scattered particles in suspension, causes a reduction in viscosity through dispersion of the inorganic particles. The particles may have a size distribution which is slightly larger than the pore size of the walls 38. By employing deflocculants and the predetermined particle size, the dispersion of the particles may reduce the permeability of the water into the walls 38 as the particles may block water absorption into pores of the walls 38. In other words, the deflocculant may sufficiently disperse the plurality of inorganic particles such that the particles reduce the ability of the pores to wick or absorb the water.

Next, a step 80 of applying external energy, e.g., a shear force such as via vibration or mixing, to the plugging mixture 74 to alter the viscosity of the plugging mixture 74 from the first viscosity to the second viscosity is performed. As explained above, the formation of the first viscosity of the plugging mixture 74 is related to the polar forces of the clay platelets arranging the platelets in the "house of cards" orientation. By applying energy to the plugging mixture 74, the polar forces between the platelets of the clay may be broken such that the platelets may slide past one another thereby decreasing the viscosity of the plugging mixture 74 to the second, lower, viscosity. As will be explained in greater detail below, the altering the viscosity of the plugging mixture 74 may be advantageous in allowing the plugging mixture 74 to flow into the channels 26 of the honeycomb body 14.

According to various examples, the second viscosity of the plugging mixture 74 may be from about 1 cP to about 40,000 cP, or from about 100 cP to about 40,000 cP, or from about 1,000 cP to about 40,000 cP, or from about 3,000 cP to about 40,000 cP. For example, the plugging mixture 74 may have a second viscosity of about 1 cP, or about 100 cP or less, or about 1,000 cP or less, or about 2,000 cP or less, or about 3,000 cP or less, or about 4,000 cP or less, or about 5,000 cP or less, or about 6,000 cP or less, or about 7,000 cP or less, or about 8,000 cP or less, or about 9,000 cP or less, or about 10,000 cP or less, or about 20,000 cP or less, or about 30,000 cP or less, or about 40,000 cP or less or any and all values and ranges therebetween. The second viscosity of the plugging mixture 74 is measured using a Brookfield viscometer while the constituents of the plugging mixture 74 are in suspension.

According to various examples, step 80 may include applying a shear force to the plugging mixture 74 to alter the viscosity of the plugging mixture 74 to the second viscosity of about 40,000 cP or less. As such, the first viscosity of the plugging mixture 74 may be about 1.5 times, about 2.0 times, about 2.5 times, about 3.0 times, about 3.5 times, about 4.0 times, about 4.5 times, about 5.0 times, about 5.5 times, about 6.0 times, about 6.5 times, about 7.0 times, about 7.5 times, about 8.0 times, about 8.5 times, about 9.0 times, about 9.5 times, about 10 times, about 20 times, about 30 times, about 40 times, about 50 times, about 60 times, about 70 times, about 80 times, about 90 times or about 100 times greater than the second viscosity. It will be understood that any and all values and ranges between those listed above are contemplated. In other words, the second viscosity is less than the first viscosity. Further, the first viscosity may be significantly greater than the second viscosity, e.g., as enabled by the reversible formation and destruction of the "house of cards" structure of clay platelets as described herein. For example, in some embodiments the first viscosity is about 150% or greater (i.e., the value of the first viscosity is at least one and a half times the value of the second viscosity), about 200% or greater, about 250% or greater, about 300% or greater, or even about 350% or greater of the value of the second viscosity. Even more preferably, the value of the first viscosity is at least about 400% or greater, about 450% or greater, about 500% or greater, about 550% or greater, about 600% or greater, about 650% or greater, about 700% or greater, about 750% or greater, about 800% or greater, about 850% or greater, about 900% or greater, about 950% or greater, about 1000% or greater (i.e., the value of the first viscosity is at least ten times the value of the second viscosity) of the value of the second viscosity. It will be understood that any and all values and ranges between those listed above in connection with the first viscosity relative to the second viscosity are contemplated. Greater differences between the first viscosity and the second viscosity are preferred because this enables the plugging material to readily and quickly flow into the channels of the honeycomb body to a target or desired depth when at the second viscosity, while also enabling the plugging mixture to be retained within the channels (to not flow back out of the channels) once the shear force is removed and viscosity reverts back toward the first viscosity.

A number of different parameters of the shear force applied to the plugging mixture 74 may be altered to produce a variety of properties in the plugging mixture 74. For example, if vibration is utilized, the frequency of vibration, how many axes the vibration is applied along, the amplitude of the vibration, the time of vibration, the vibration profile, etc. If mixing is utilized, the shape or contour of mixing implements (e.g., blades), mixing pattern (e.g., rotation of blades, back and forth movement of blades, etc.), mixing speed, number of mixing implements, etc. As explained above, the house of cards structure of the clay is weakly stable. As such, applying the shear force to the plugging mixture 74 may break the bonds that form between the platelets, thereby reducing the viscosity of the plugging mixture 74 from the first viscosity to the second viscosity.

The plugging mixture 74 may be vibrated along at least one axis, at least two axes and/or along three axes such that the plugging mixture 74 has a second viscosity. For example, the plugging mixture 74 may be vibrated along an X-axis, a Y-axis and/or a Z-axis of the plugging mixture 74. In such examples, the axes of vibration may be perpendicular to one another. It will be understood that the plugging mixture 74 may be vibrated along more than three axes and that one or more of the axes may not be perpendicular to one or more of the other axes of vibration. As will be explained in greater detail below, vibration of the plugging mixture 74 along a variety of axes may be advantageous in reducing and/or eliminating harmonic resonances which may affect the ability of the plugging mixture 74 to enter the channels 26.

The plugging mixture 74 may be vibrated at a frequency of from about 1 hz to about 10,000 hz, or about 1 hz to about 9,000 hz, or about 1 hz to about 8,000 hz, or about 1 hz to about 7,000 hz, or about 1 hz to about 6,000 hz, or about 1 hz to about 5,000 hz, or about 1 hz to about 4,000 hz, or about 1 hz to about 3,000 hz, or about 1 hz to about 2,000 hz, or about 1 hz to about 1,000 hz or any and all values and ranges therebetween. For example, the plugging mixture 74 may be vibrated at a frequency of about 1 hz, about 10 hz, about 20 hz, about 30 hz, about 40 hz, about 50 hz, about 60 hz, about 70 hz, about 80 hz, about 90 hz, about 100 hz, about 200 hz, about 300 hz, about 400 hz, about 500 hz or any and all values and ranges therebetween. A vibration profile can include a combination of different frequencies (and/or amplitudes) that are applied to the plugging material. The different frequencies (and/or amplitudes) can be applied simultaneously (e.g., concurrently at discrete frequencies or concurrently over a range of frequencies) and/or variably transitioned between during a duration window of application of the vibrations. That is, the vibrations can variably switch or transition between different combinations of frequencies and/or amplitudes during the vibration process over time, e.g., with each combination of one or more frequencies and/or amplitudes being applied for a set amount of time before transitioning to the next combination of one or more frequencies and/or amplitudes. Table 2 below illustrates the relationship between the vibration frequency of the plugging mixture 74 and the second viscosity achieved by the plugging mixture 74 when the plugging mixture 74 has the composition listed in Table 1.

TABLE 2

| Vibration Frequency (Hz) | Viscosity (cP) |
|---|---|
| No Vibration | >100,000 |
| 100 | 10,000 |

TABLE 2-continued

| Vibration Frequency (Hz) | Viscosity (cP) |
|---|---|
| 75 | 7,900 |
| 50 | 3,000 |

The plugging mixture 74 may be vibrated at a variety of vibrational amplitudes. Vibrational amplitude may be expressed in terms of "G" which is equal to 9.8 m/s$^2$. The plugging mixture 74 may be vibrated at a vibrational amplitude of from 0.1 G to about 50 G, or from about 0.1 G to about 40 G, or from about 0.1 G to about 30 G, or from about 0.1 G to about 20 G, or from about 0.1 G to about 10 G. For example, the plugging mixture 74 may be vibrated at a vibrational amplitude of about 0.1 G or greater, about 0.5 G or greater, about 1 G or greater, about 5 G or greater, about 10 G or greater, about 15 G or greater, about 20 G or greater, about 25 G or greater, about 30 G or greater, about 35 G or greater, about 40 G or greater, about 45 G or greater, about 50 G or greater or any and all values and ranges therebetween. It will be understood that in examples where the plugging mixture 74 is vibrated along different or multiple axes, the amplitude of vibration may be different along one or more of the axes relative to other axes of vibration.

The vibration of the plugging mixture 74 may be done with a variety of vibrational wave profiles. For example, the vibration of the plugging mixture 74 may have a square wave vibrational profile, a sine, or sinusoidal, vibrational wave profile, a triangle wave vibrational profile, a hanning vibrational wave profile, other wave profiles and/or combinations thereof. The vibration of the plugging mixture 74 may be accomplished using a pulsed vibration and/or with a periodic vibration. It will be understood that in examples where the plugging mixture 74 is vibrated along different or multiple axes, the wave profile of vibration may be different along one or more of the axes relative to other axes of vibration. Further, it will also be understood that in examples where the plugging mixture 74 is vibrated along different or multiple axes, the pulsed or periodic nature of the vibration may be different along one or more of the axes relative to other axes of vibration.

The plugging mixture 74 may be vibrated for a predetermined time to reach the second viscosity. For example, the plugging mixture 74 may be vibrated for a time ranging from about 1 second to about 40 seconds, or from about 1 second to about 30 seconds, or from about 1 second to about 20 seconds, or from about 1 second to about 19 seconds, or from about 1 second to about 18 seconds, or from about 1 second to about 17 seconds, or from about 1 second to about 16 seconds, or from about 1 second to about 15 seconds, or from about 1 second to about 14 seconds, or from about 1 second to about 13 seconds, or from about 1 second to about 12 seconds, or from about 1 second to about 11 seconds, or from about 1 second to about 10 seconds, or from about 1 second to about 9 seconds, or from about 1 second to about 8 seconds, or from about 1 second to about 7 seconds, or from about 1 second to about 6 seconds, or from about 1 second to about 5 seconds, or from about 1 second to about 4 seconds, or from about 1 second to about 3 seconds, or from about 1 second to about 2 seconds. For example, the plugging mixture 74 may be vibrated for about 1 second, 2 seconds, 3 seconds, 4 seconds, 5 seconds, 6 seconds, 7 seconds, 8 seconds, 9 seconds, 10 seconds, 11 seconds, 12 seconds, 13 seconds, 14 seconds, 15 seconds, 16 seconds, 17 seconds, 18 seconds, 19 seconds, 20 seconds or any and all values and ranges therebetween.

As is apparent, a variety of combinations of vibrational frequency, vibrational amplitude and vibrational wave profile are possible. For example, while vibrating the plugging mixture 74 along at a first axis and a second axis such that the plugging mixture has a second viscosity, the vibrational amplitude and the vibrational frequency of the first axis may be different than a vibrational amplitude and a vibrational frequency of the second axis. Further, while vibrating the plugging mixture 74 along at the first, second and third axes such that the plugging mixture has a second viscosity, the plugging mixture 74 may be vibrated with a different vibrational amplitude and vibrational frequency along each of the three axes.

According to a specific example, the method 50 and/or step 80 may be carried out by a closed loop vibrational system 82. In such an example, a plurality of vibration exciters 84 (e.g., one or more exciters for each axis of vibrations) are placed on vibration isolation dampeners to isolate external vibrations not emitted from the exciter 84. In examples where the plugging mixture 74 is vibrated along two axes, the system 82 may include two vibrational exciters 84 while in examples where the plugging mixture 74 is vibrated along three axes, the system 82 may include three vibrational exciters 84. A signal amplifier may be connected to the vibrational exciters 84. A multiple analog input/output box may be used as an interface between a signal generator and the signal amplifier and to synchronize the generated signal and a multi-axial accelerometer 86. The multi-axis accelerometer 86 may be coupled to a shaker table 88 such that the acceleration of the plugging mixture 74 may be measured in real time. The exciters 84 are coupled to the shaker table 88 on which the plugging mixture 74 in the receptacle 76 is positioned. An input vibration energy (e.g., from about 0 V to about 5 V) is generated using software with the desired signal shape (e.g., square, sine, triangular, hanning, etc.) and sent to the signal amplifier. Subsequently, the resulting vibration response of the plugging mixture 74 is monitored and quantified using the multiaxial accelerometer 86 coupled on the shaker table 88. Consequently, the vibrational response of the plugging mixture 74 is then adjusted to the desired amplitude, frequency and vibrational profile by monitoring the response using the multi-axis accelerometer 86 and adjusting the intensity, frequency and profile. The desired vibration duration may be provided and monitored by the software and, upon reaching the desired duration, a relay signal (e.g., from about 0 V to about 5 V) is fed to the exciters 84 to terminate the vibrational energy.

Next, while the plugging mixture 74 is being vibrated to the second viscosity, a step 100 of bringing the honeycomb body 14 and its plurality of channels 26 into contact within the plugging mixture 74 such that a portion of the plugging mixture 74 having the second viscosity flows into the filter channels 26 is performed. As such, the plugging mixture 74 is flowable into the channels 26 at the second viscosity. As explained above, the mask layer 58 is disposed on at least one end of the honeycomb body 14. The end of the filter 10 with the mask layer 58 is positioned to contact the plugging mixture 74 such that the plugging mixture 74 flows through the holes 66 and into the channels 26. The honeycomb body 14 may be brought into contact with the plugging mixture 74 inside of the receptacle 76 or in a different container.

The honeycomb body 14 may be contacted, submerged, or immersed, to a predetermined depth within the plugging mixture 74. For example, honeycomb body 14 may be submerged to a depth of about 0.5 mm or greater, about 1 mm or greater, about 1.5 mm or greater, about 2 mm or greater, about 2.5 mm or greater, about 3 mm or greater, about 3.5 mm or greater, about 4 mm or greater, about 4.5 mm or greater, about 5 mm or greater, about 5.5 mm or greater, about 6.0 mm or greater, about 6.5 mm or greater, about 7 mm or greater, about 7.5 mm or greater, about 8 mm or greater, about 8.5 mm or greater, about 9 mm or greater, about 9.5 mm or greater, about 1.0 cm or greater, about 2.0 cm or greater, about 3.0 cm or greater, about 4.0 cm or greater, about 5.0 cm or greater, about 6.0 cm or greater or any and all values and ranges therebetween. The honeycomb body 14 may be allowed to contact the plugging mixture 74 under a force. For example, the force at which the honeycomb body 14 contacts the plugging mixture 74 may be less than gravitational force, at gravitational force, or at a force greater than gravity. It will be understood that the force at which the honeycomb body 14 is contacted with the plugging mixture 74 may vary with time.

Step 100 may be performed for a predetermined time. According to various examples, step 100 may be performed for about 1 second to about 30 seconds or from about 1 second to about 20 seconds. For example, step 100 may be performed for about 0.5 seconds or greater, about 1 second or greater, about 1.5 seconds or greater, about 2 seconds or greater, about 2.5 seconds or greater, about 3 seconds or greater, about 3.5 seconds or greater, about 4 seconds or greater, about 4.5 seconds or greater, about 5 seconds or greater, about 5.5 seconds or greater, about 6.0 seconds or greater, about 6.5 seconds or greater, about 7 seconds or greater, about 7.5 seconds or greater, about 8.0 seconds or greater, about 8.5 seconds or greater, about 9 seconds or greater, about 9.5 seconds or greater, about 10 seconds or greater, about 11 seconds or greater, about 12 seconds or greater, about 13 seconds or greater, about 14 seconds or greater, about 15 seconds or greater, about 16 seconds or greater, about 17 seconds or greater, about 18 seconds or greater, about 19 seconds or greater, about 20 seconds or greater or any and all values and ranges therebetween. It will be understood that the length of time the honeycomb body 14 contacts the plugging mixture 74 may be dynamically adjusted based on the speed at which the plugging mixture 74 flows into the honeycomb body 14.

The amount of time the honeycomb body 14 is in contact with the plugging mixture 74 while energy is applied to the plugging mixture may affect the length of the resulting plugs 30. For example, higher relative values of the second viscosity may need longer times of contact between the honeycomb body 14 and the plugging mixture 74 in order for the plugging mixture 74 to fill the channels 26 to a desired height or depth. As the second viscosity of the plugging mixture 74 is sufficiently low enough to flow through the holes 66, the plugging mixture 74 preferably tends to self-level within the channels 26. As the plugging mixture 74 self-levels within the channels 26 due to gravity, the resulting plugs 30 are able to achieve a highly uniform length and low standard deviation as outlined above.

Next, a step 104 of increasing the viscosity of the portion of the plugging mixture 74 in the plurality of channels 26, e.g., back toward the first viscosity, is performed. According to various examples, step 104 of increasing the viscosity of the portion of the plugging mixture 74 in the plurality of channels 26 comprises stopping or reducing the application of external energy to the plugging mixture 74. According to various examples, step 104 may be accomplished by changing the frequency of vibration to a frequency which does not transfer sufficient energy to the plugging mixture 74 and/or by ending vibration of the plugging mixture 74. It will be understood that the vibration profile and amplitude may additionally or alternatively be altered with the frequency. As the first viscosity is greater than the second viscosity, transitioning the portion of the plugging mixture 74 within the channels 26 back toward the first viscosity enables the plugging mixture 74 to increase in viscosity thereby retaining the plugging mixture 74 within the channels 26. Furthermore, according to various examples, the viscosity of the portion of plugging mixture 74 within the channels 26 will transition to a value that is greater than that of the first viscosity as water (or other liquid vehicle) present within the plugging mixture 74 is absorbed into the porous walls of the honeycomb body 14, thereby resulting in a greater solids load in the plugging mixture 74 in the channels of the honeycomb body, and leading to a higher viscosity.

Next, a step 108 of removing the honeycomb body 14 from contact with the plugging mixture 74 is performed. The honeycomb body 14 may be disengaged from the plugging mixture 74 in a variety of manners including directly lifting the honeycomb body 14 from the plugging mixture 74 and/or rotating the honeycomb body 14 relative to the plugging mixture 74. It will be understood that vibration and/or other energy may be applied to the honeycomb body 14 and/or plugging mixture 74 to help facilitate separation of the honeycomb body 14 from the plugging mixture 74.

According to various examples, the receptacle 76 may contain sufficient plugging mixture 74 such that a second portion of the plugging mixture 74 remains in the receptacle 76 when the vibrating is stopped or reduced and the honeycomb body 14 is removed from the receptacle 76. That is, the portion of the plugging mixture 74 remaining in the receptacle 76 after step 108 in one embodiment will revert to or toward the first (higher) viscosity once the shear force is removed (e.g., the vibration is stopped) and thus can be reused for plugging one or more subsequent honeycomb bodies. More particularly, due to the reversible nature of the formation and destruction of the "house of cards" structure of the clay platelets used in the plugging mixture 74, and thus the ability of the plugging mixture 74 to reversibly transition between the first (higher) viscosity and the second (lower) viscosity, steps 70, 80, 100, 104, and 108 can be repeated for one or more subsequent honeycomb bodies using the remaining portion of the plugging mixture 74 after the step 108 is completed for any given honeycomb body.

Once the honeycomb body 14 is disengaged from the plugging mixture 74, the honeycomb body 14 may be dried and/or heated to convert the portion of the plugging mixture 74 remaining in the honeycomb body 14 into the plugs 30. The sintering time and temperature may vary depending on the composition of the plugging mixture 74 as well as other factors. For example, the filter 10 may be sintered at temperatures of from about 800° C. to about 1500° C. For example, the sintering temperature of the filter 10 may be about 800° C., about 900° C., about 1,000° C., about 1,100° C., about 1,200° C., about 1,300° C., about 1,400° C., about 1,500° C., or any and all values and ranges therebetween.

According to various examples, the honeycomb body 14 may undergo one or more treatments before, during and/or after any of the steps of the method 50. The treatments may help to control the rate of the fluid component migration of the plugging mixture 74 into the porous walls 38 of the honeycomb body 14. Without being bound by theory, the treatments may provide additional mechanisms to govern the overall process and resultant quality of the plugs 30 by controlling the absorption of the liquid of the plugging mixture 74 into the honeycomb body 14. In a first example, the honeycomb body 14 may be exposed to a hydrophobic coating treatment. In such an example, the entrance (e.g., the first or second ends 18, 22) to the channels 26 are exposed to a hydrophobic coating by immersion or spraying, the hydrophobic coating being used to inhibit capillary action that draws fluid from the plugging mixture 74 into the walls 38 of the channels 26. Use of the hydrophobic coating may be used to alter the rate of viscosity change of the plugging mixture 74 as the mixture 74 flows into the channels 26. Otherwise, in some embodiments an untreated filter may absorb a liquid such as water from the plugging mixture 74 which may cause the plugging mixture 74 to undergo water loss upon entering the channels 26, thereby resulting in an undesirable viscosity increase necessitating higher plugging pressure to achieve requisite depths of the plugging mixture 74 in the channels 26. The hydrophobic material may be applied as a coating to a targeted depth into the channel 26 such that once the plugging mixture 74 extends past this point, the rapid increase in viscosity due to water loss advantageously provides for stoppage of the flow of plugging mixture 74 and thereby provides control of the depth of the plugging mixture 74.

Additionally or alternatively to the use of the hydrophobic coating, the honeycomb body 14 may be presoaked, such as with water and/or a thinned version of the plugging mixture 74, to decrease the capillary action that draws fluid from the plugging mixture 74 during the method 50. In some embodiments, the honeycomb body 14 may be presoaked in water having a temperature of from about 20° C. to about 80° C. In a specific example, the honeycomb body 14 may be presoaked in water having a temperature of about 60° C. The presoaking may take place for a time period of from about 1 second to about 1 hour. After presoaking, the honeycomb body 14 may be partially dried to remove excess water.

It will be understood that although the method 50 was described in a particular order, various steps of the method 50 may be performed out of order or simultaneously without departing from the teachings provided herein. Further, it will be understood that one or more steps may be added or omitted from the method 50 without departing from the teachings provided herein.

As the plugging mixture 74 attains a state of relatively low viscosity inside the honeycomb body 14, the plugging mixture 74 may advantageously self-level within the channels 26, leading to a high uniformity among the resulting plugs 30. For example, at a depth, or length, of the plugs 30 of about 4.5 mm, the standard deviation of the plugs 30 may be about 1.5 mm or less, about 1 mm or less, or about 0.5 mm or less. As the plugging mixture 74 self-levels within the channels 26, filters 10 made with the above-described process preferably have a high degree of reproducibility in plug depth, such as due to the even front of the plugging mixture 74 as it advances through the channels 26. Also, the lowered viscosity of the plugging mixture 74 inside the honeycomb body 14 may allow gasses entrained within the plugging mixture 74 to escape from the plugging mixture 74, thereby helping to minimize and/or eliminate voids within the plugs 30. Such reduce the presence of voids in the plugs 30 may increase the durability of the plugs 30 in operation of the filter 10. In addition to reducing the presence of voids, the lowered viscosity of the plugging mixture 74 may help to decrease and/or eliminate the formation or presence of dimples in the plugs 30. Furthermore, plugging mixture 74 with lowered viscosity may provide an enhanced capability to effectively plug peripheral channels 26 plugging or other variously sized or shaped channels 26 in various geometries. Also, the plugging mixture 74, and therefore the plugs 30, may in some embodiments contain no organics, thereby eliminating further process steps to the organic materials. Furthermore, lowering the viscosity of the plugging mixture 74 may allow for smaller holes 66 to be made in the mask layer 58 and still provide advantageous flow and material insertion, which may also simplify construction and/or application of the mask layer 58. Preferably the resulting plugs 30 of the filter 10 are more uniform as a result of the methods disclosed herein, and in some embodiments a greater volume of ash storage may be achieved by the filter 10 as compared to conventional designs which might otherwise be taken up by excess lengths of various plugs. Moreover, as the holes 66 may be smaller than conventional holes due to the lower viscosity of the plugging mixture 74, smaller lasers 60 and a more rapid forming of the holes may be utilized, resulting in time and/or cost savings. For example, in some embodiments a 65% reduction or greater in size of the holes 66 as compared to conventional methods can be provided in the mask while allowing adequate distribution of the plugging mixture inside the honeycomb body 14. Further, the methods disclosed herein may allow simpler shapes (e.g., circular holes 66 as compared to square conventional holes) of the holes 66 to be utilized, and the holes 66 may be formed more quickly than conventional processes. Eighth, as the plugging mixture 74 may have a lower viscosity than conventional designs, the plugging mixture 74 may more easily flow against the walls 38 of the channels 26 such that a greater adhesion to the honeycomb body 14 is obtained compared to conventional designs. For example, as the plugging mixture 74 may form a more intimate contact with the walls 38 as compared to conventional designs, the resulting plugs 30 may have a greater surface area contact with the walls 38 such that a greater adhesion strength of the plugs 30 to the walls 38 is achieved. Further, by allowing vibration to occur in more than one axis of the plugging mixture 74, harmonic ring modes of the vibration and local dead spots where the vibrations cancel may be eliminated to form a uniform vibration across the plugging mixture 74 which may result in the formation of uniform plugs 30.

EXAMPLES

Provided below are non-limiting examples of the present disclosure.

Referring now to FIGS. 7A-7D, depicted is a wall flow particulate filter (e.g., filter 10 having a plurality of cells comprising channels 26) that was plugged using vibrational energy to lower the viscosity of a plugging slurry (e.g., the plugging mixture 74) to form a plurality of seals or blockages (e.g., the plugs 30). The wall flow filter depicted could be used as, for example, a gasoline particulate filter. The particulate filter had a diameter of about 4.66". The honeycomb body that led to the particulate filter was immersed in the plugging slurry at about a 2 cm immersion depth for about 10 seconds. The plugging slurry had been vibrated for about 8 seconds prior to immersion of the honeycomb body. A visual inspection revealed that uniform plug depth was achieved with minimized voids and dimples, and good corner filling and wall adhesion were achieved. It can also be seen that peripheral cells near the outermost periphery or skin of the honeycomb body were plugged as well.

Figure 8A:
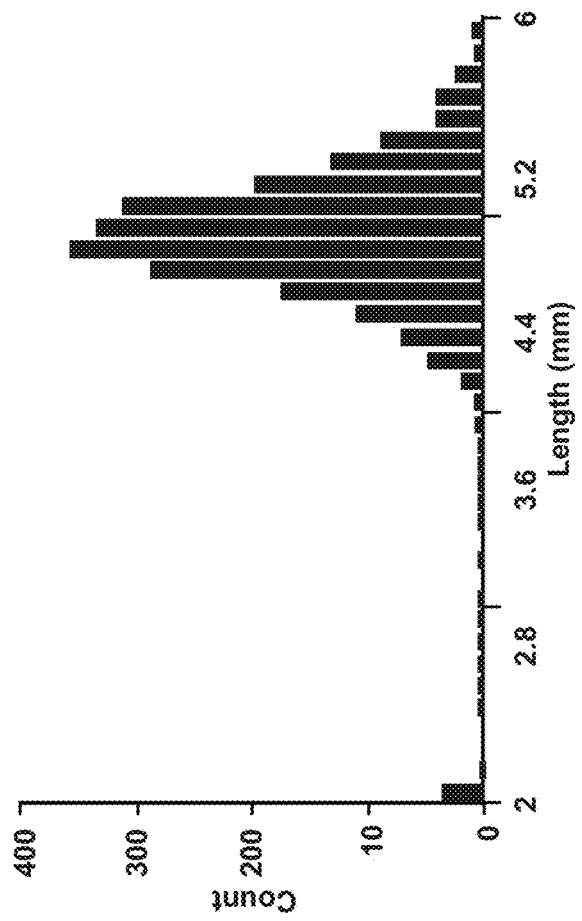
FIG. 8A is a histogram illustrating plug depth distribution on one end of a second example of a wall-flow particulate filter.
Figure 8B:
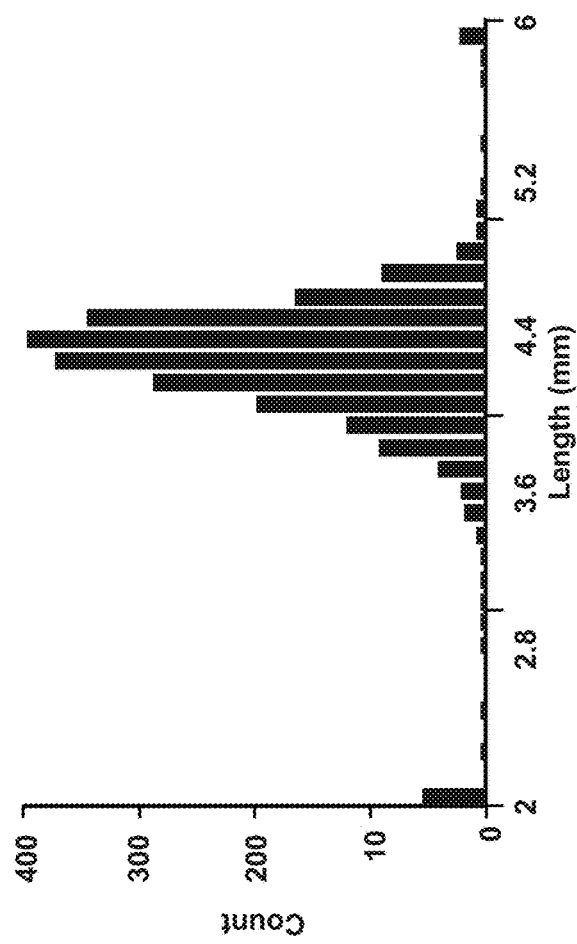
FIG. 8B is a histogram illustrating plug depth distribution on a second end of the second example of the wall flow particulate filter.

Referring now to FIGS. 8A and 8B, plug depth (plug length) and quality were evaluated using computed tomography scanning. The computed tomography scan data illustrates uniform plugs with an average depth of about 4.84 mm with a 0.60 mm standard deviation for one side of the particulate filter and an average depth of 4.25 mm and a standard deviation of 0.66 mm for the other side of the particulate filter.

Figure 9:
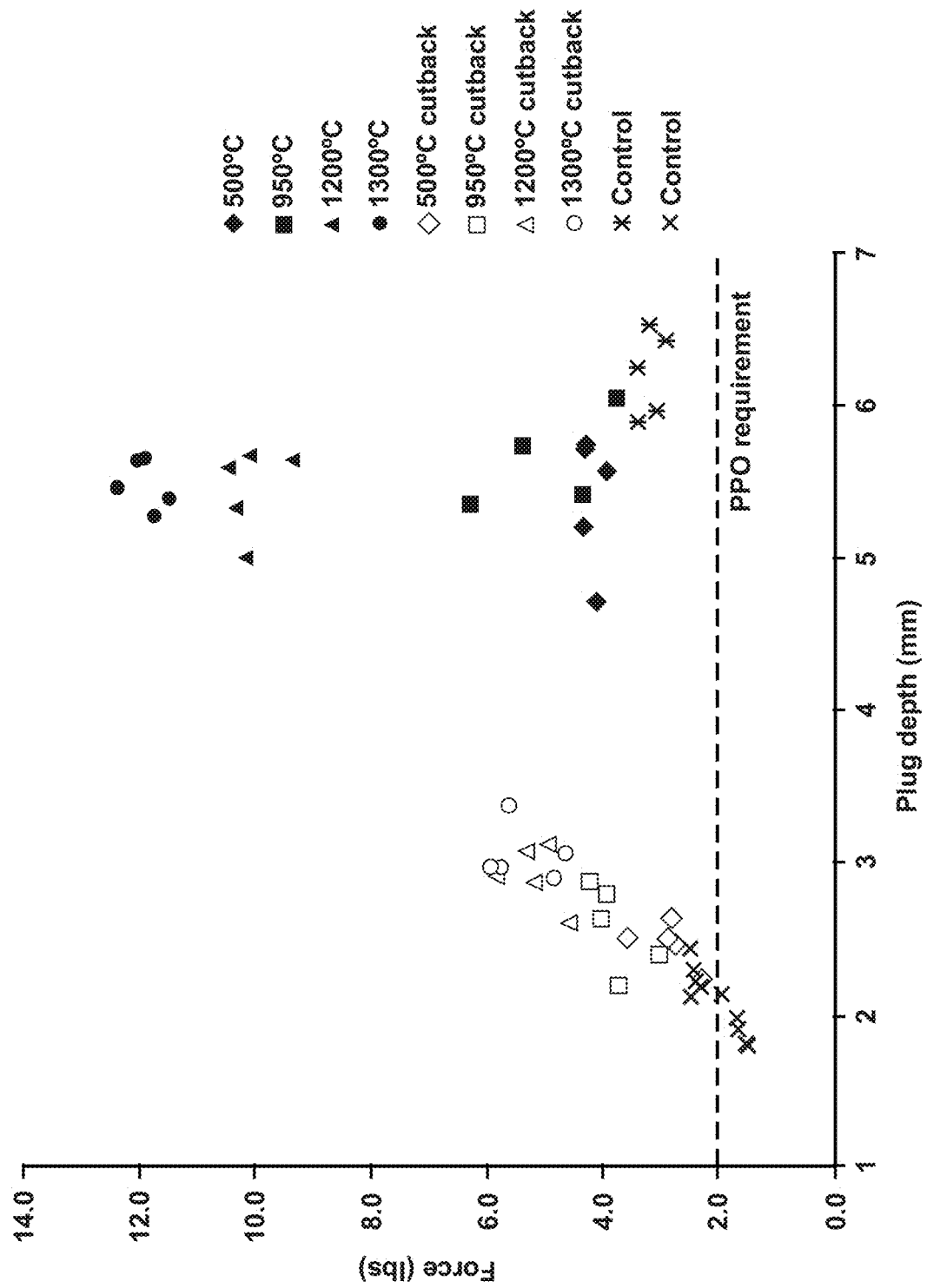
FIG. 9 is a plot demonstrating curing temperature vs. plug push out force.

Referring now to FIG. 9, the strength of plugs formed consistent with the present disclosure was evaluated through plug push out (PPO) testing. The plugged particulate filter was cut into quarters and calcined to temperatures of 500° C., 950° C., 1200° C. and 1300° C. Some quarters were measured as calcined, and some were measured after calcined and cut back to keep only a 3 mm depth of plugs. As can be seen in FIG. 9, all samples passed a 2 lbs plug strength product requirement.

Tables 3-5 provide experimental data of plug depth under a variety of formation conditions. As seen across the tables, a variety of plug depths can be accomplished by varying one or more of immersion depth, plugging time, and vibrational energy. In Table 3, a 2 cm immersion depth and a 5 second immersion time were applied with no vibrational energy or 50 hz vibrational energy. As apparent from Table 3, the addition of the vibrational energy increased the depth of plugs in the filter. In Table 4, a 5 second immersion time and 50 hz vibrational energy were applied with an immersion depth of 1 cm or 2 cm. As apparent from Table 4, the increased immersion, or contact, depth increased the depth of the plugs within the filter. In Table 5, a 1 cm immersion depth and a 50 hz vibrational energy were applied for an immersion time of 1 second or 5 seconds. As apparent from Table 5, the increased immersion time increased the depth of the plugs within the filter.

TABLE 3

| Vibrational Energy | Plug Depth |
| --- | --- |
| No vibrational energy | 1-2 mm |
| 50 hz vibrational energy | 4-5 mm |

TABLE 4

| Immersion Depth | Plug Depth |
| --- | --- |
| 1 cm | 3 mm |
| 2 cm | 4-5 mm |

TABLE 5

| Immersion Time | Plug Depth |
| --- | --- |
| 1 second | 1 mm |
| 5 seconds | 3 mm |

Figure 10:
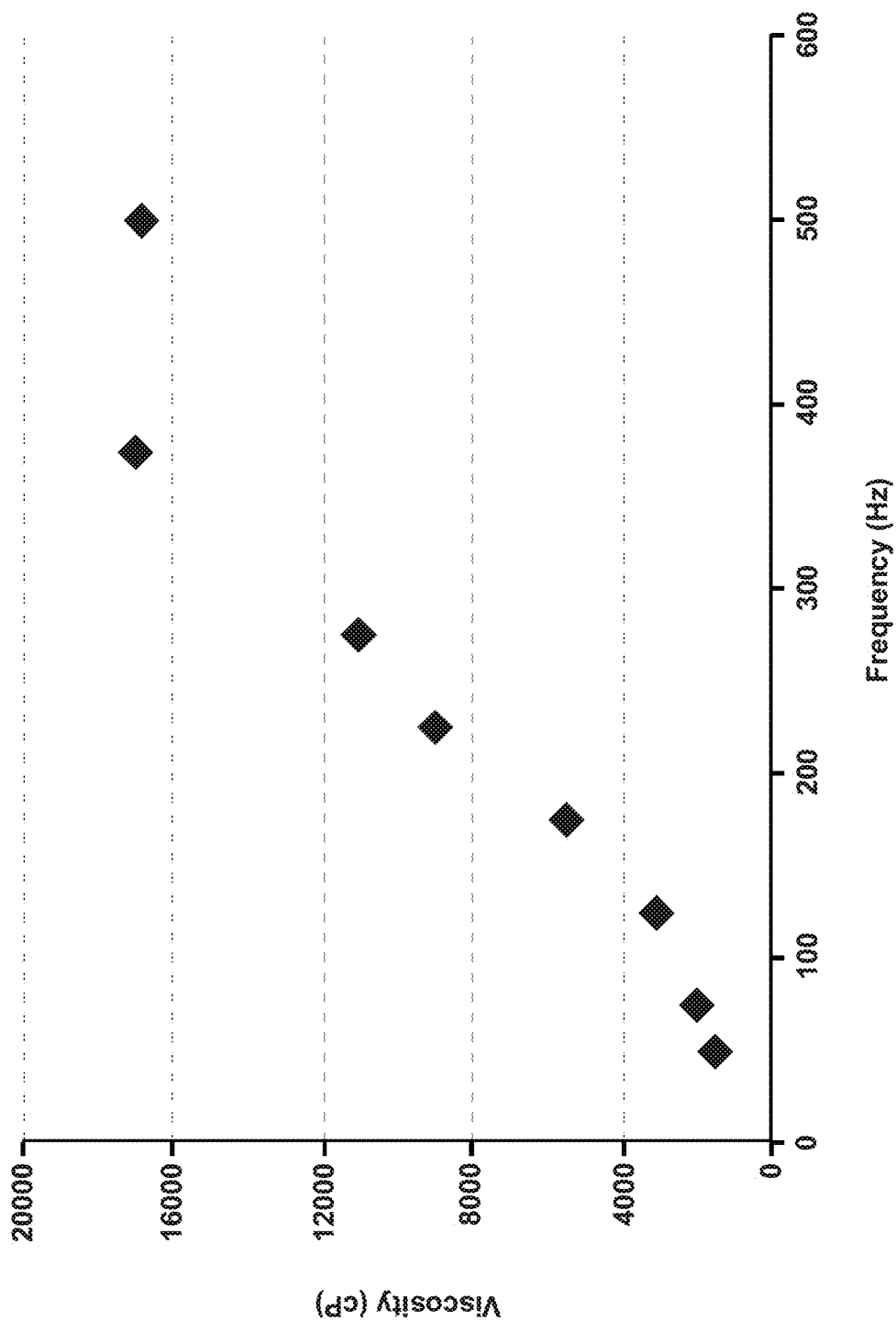
FIG. 10 is a plot of vibrational frequency vs. viscosity for a slurry.

Referring now to FIG. 10, depicted is a plot of frequency vs. viscosity for a plugging slurry which illustrates that the viscosity is a function of the generated vibration frequency. The composition of the plugging slurry is the same as provided in Table 1 above. As is evident from the plot, the plugging slurry increases in viscosity with an increasing frequency of vibration. Without being bound by theory, it is believed that as the frequency of the vibration is increased, less energy may effectively transferred to the individual components (e.g., particles or platelets of clay) of the slurry and therefore may be less likely to decrease the viscosity of the slurry. As can be seen, based on target blockage requirements, the viscosity of the slurry can be adjusted based on the vibration frequency which allows process control to achieve the desired viscosity with the vibrational parameters.

Figure 11:
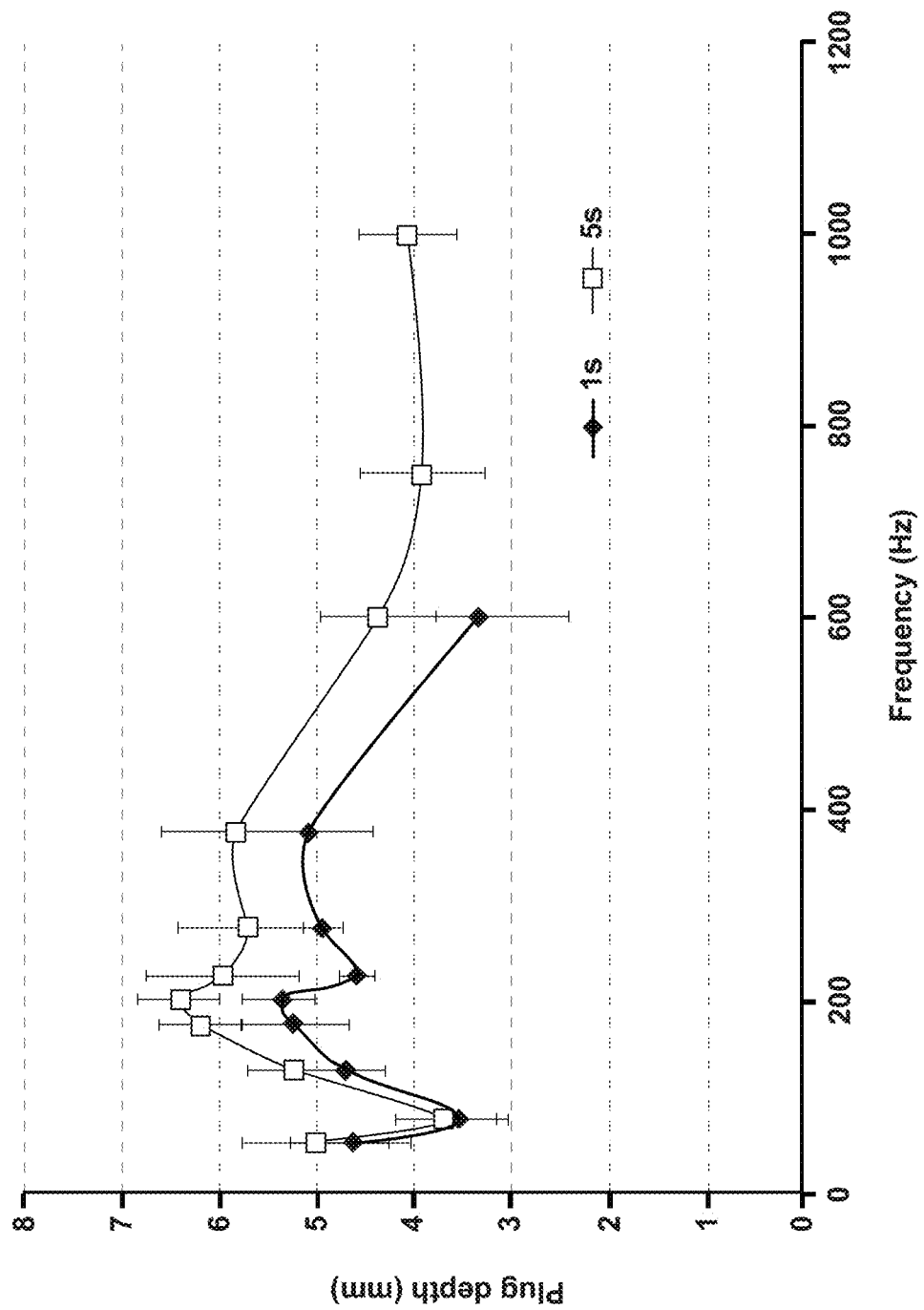
FIG. 11 is a plot of vibrational frequency vs. plug depth for wall flow filters for different contact times.
Figure 12A:
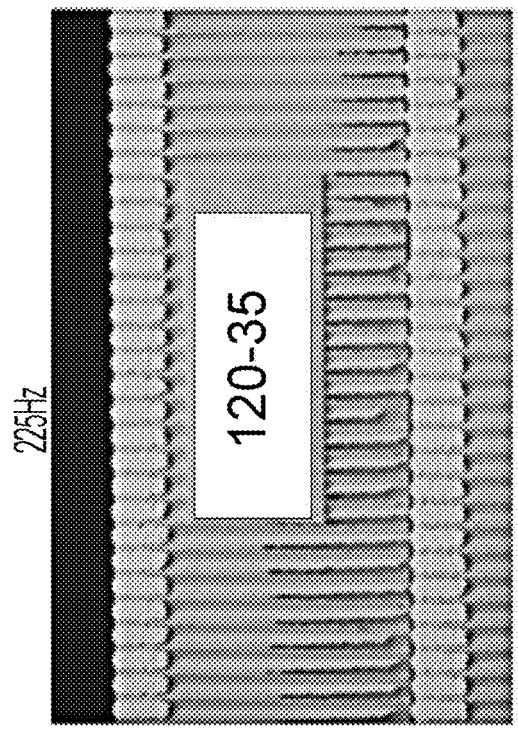
FIG. 12A is an image of plugs formed at a vibrational frequency of 50 Hz.
Figure 12C:
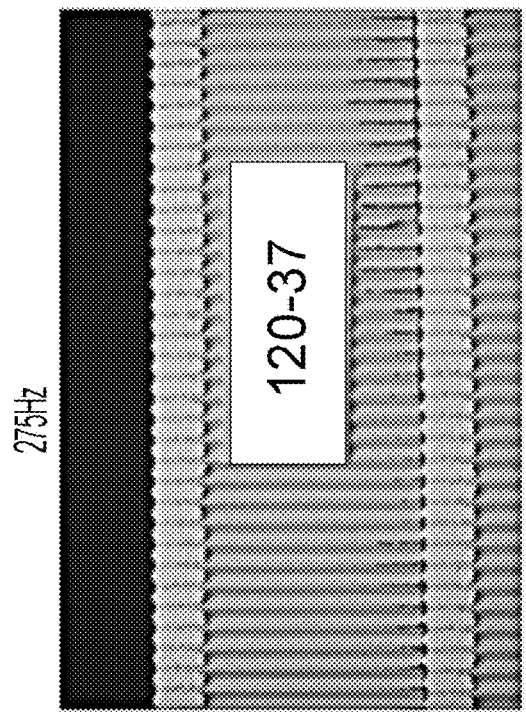
FIG. 12C is an image of plugs formed at a vibrational frequency of 225 Hz.
Figure 12B:
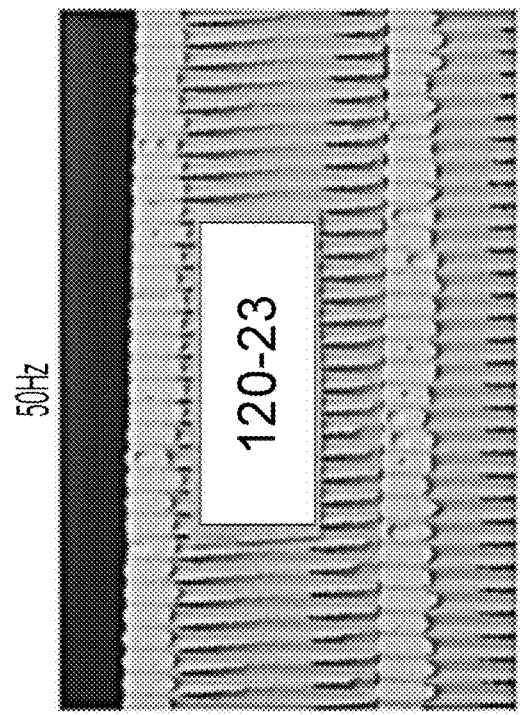
FIG. 12B is an image of plugs formed at a vibrational frequency of 125 Hz.
Figure 12D:
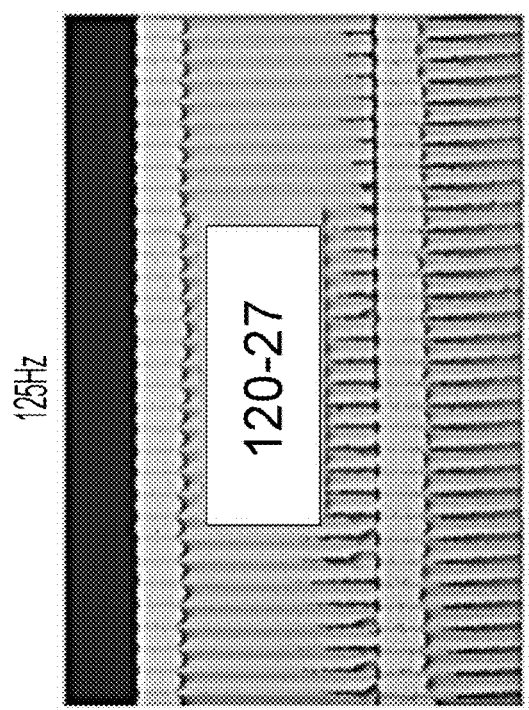
FIG. 12D is an image of plugs formed at a vibrational frequency of 275 Hz.

Referring now to FIG. 11, depicted is a plot of frequency vs. the plug depth in a wall flow filter based on the amount of time the wall flow filter is vibrated for while immersed in the slurry. For the depicted example, the composition of the slurry used is the same as FIG. 10. The plot illustrates that the immersion duration is also a factor in the depth of the blockages. Based on the desired plug depth, different vibration frequency and immersion duration can be applied to the slurry mixture. As apparent from FIG. 11, plug depths of from about 4 mm to about 6 mm may be achieved in the frequency range of from about 125 Hz to about 375 Hz. Good plug quality and depth consistency may be achieved in the frequency range of about 125 Hz to about 225 Hz.

FIGS. 12A-12D demonstrate plug quality in the wall flow filter for different vibrational frequencies using the same slurry composition used in FIGS. 10 and 11. The wall flow filter of FIG. 12A was vibrated at a frequency of about 50 Hz. The wall flow filter of FIG. 12B was vibrated at a frequency of about 125 Hz. The wall flow filter of FIG. 12C was vibrated at a frequency of about 225 Hz. The wall flow filter of FIG. 12D was vibrated at a frequency of about 275 Hz. It can be observed that a vibration frequency of from about 125 Hz to about 275 Hz provides a process window for the vibration frequency to achieve substantially uniform blockage quality.

Figure 13:
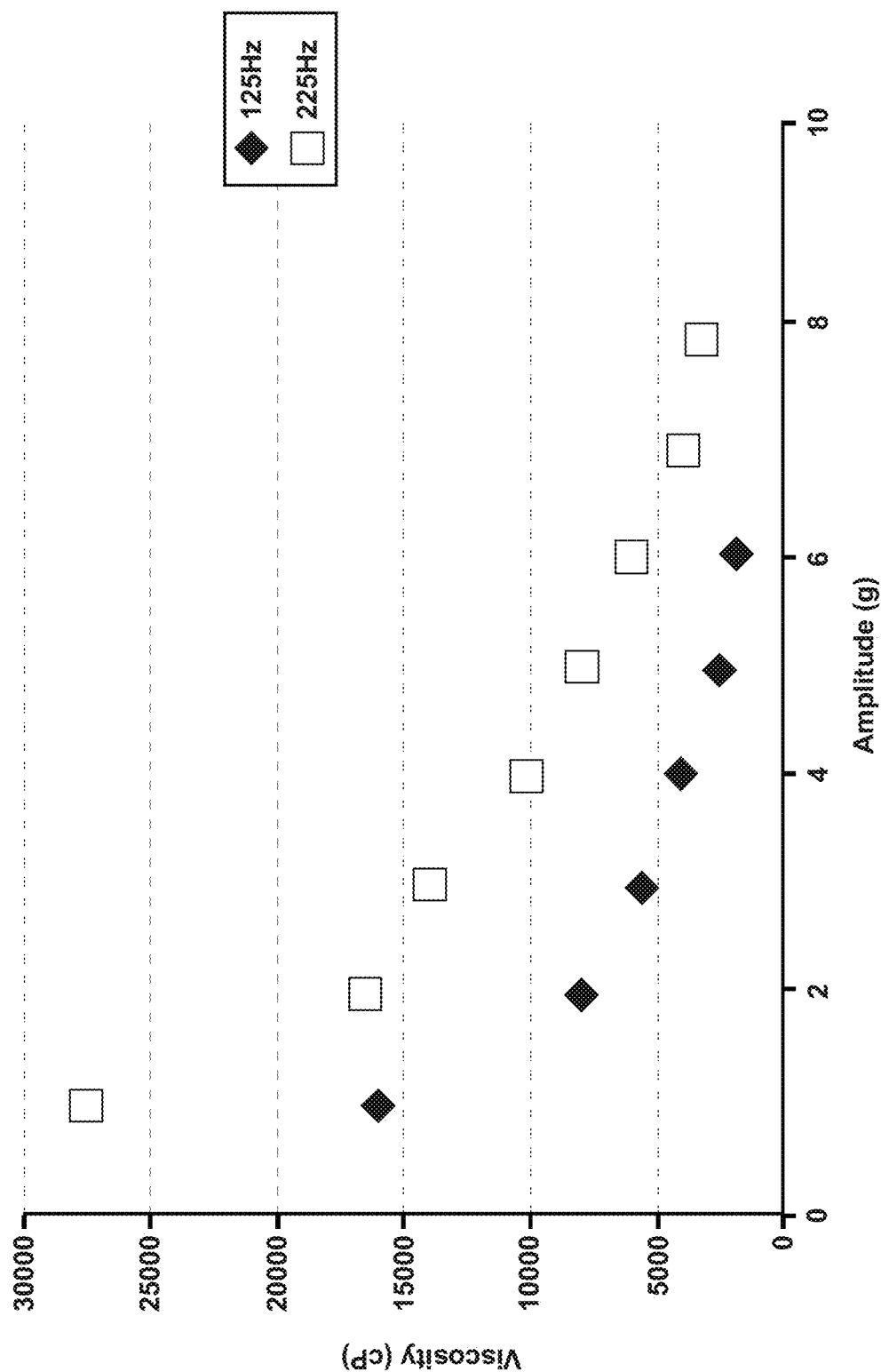
FIG. 13 is a plot showing the relationship between amplitude and viscosity of a plugging slurry for two different vibrational frequencies.
Figure 14:
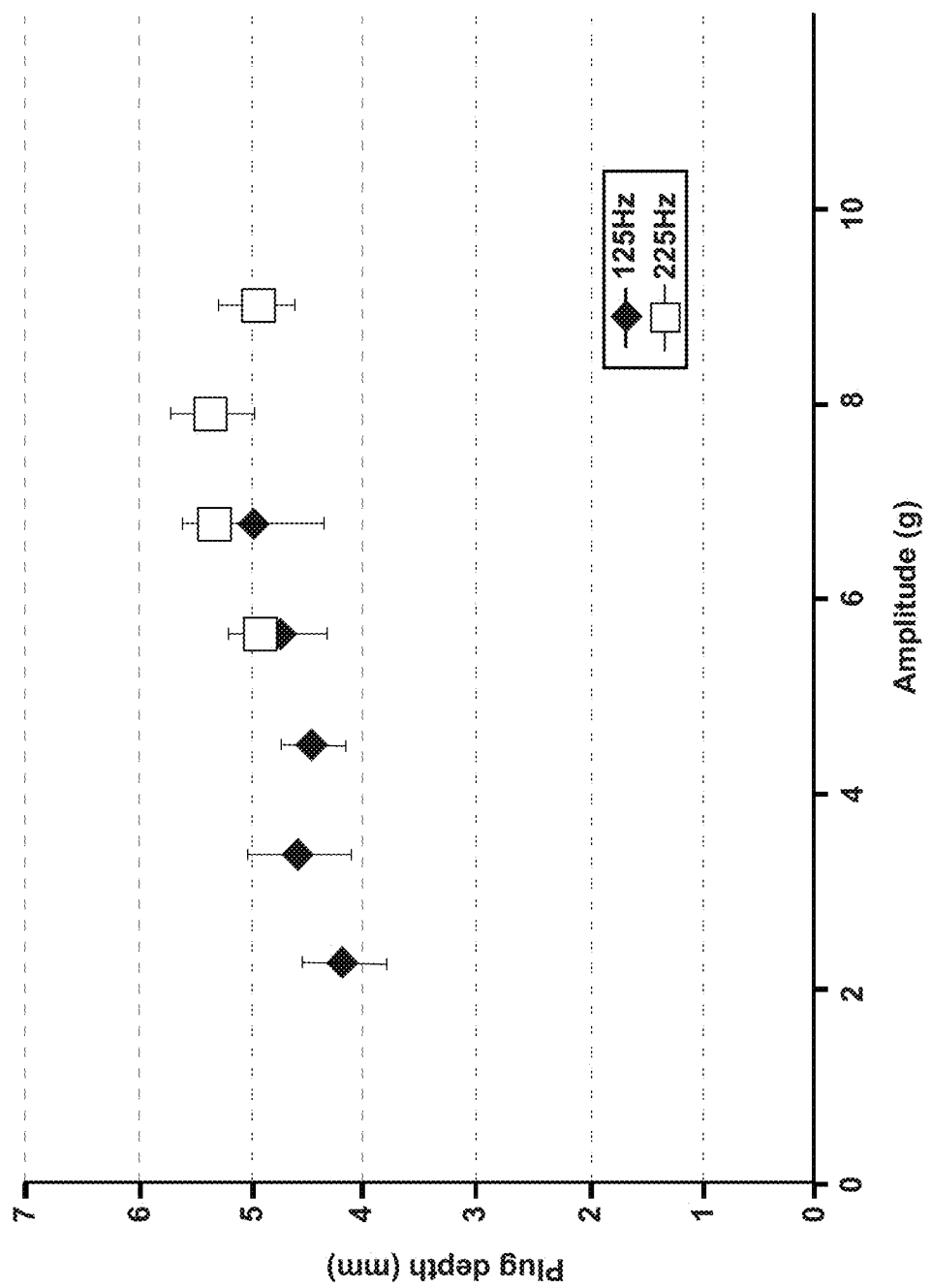
FIG. 14 is a plot showing the relationship between amplitude and plug depth for two different vibrational frequencies.

Referring now to FIGS. 13 and 14, provided are plots showing the relationship between amplitude and viscosity of a plugging slurry for two different vibrational frequencies and the relationship between amplitude and plug depth for two different vibrational frequencies, respectively. The composition of the slurry is substantially that as provided above in Table 1. As can be seen, the slurry viscosity decreases with increasing vibration amplitude. Without being bound by theory, it is believed that as the amplitude of the vibrational energy increases the force tending to shear the house of cards structure of the clay apparat also increases thereby decreasing viscosity of the plugging slurry. Thus, the vibration amplitude along with the frequency is a component in achieving the desired slurry viscosity and consequently the optimal plugging quality in the wall flow filter.

Figure 15A:
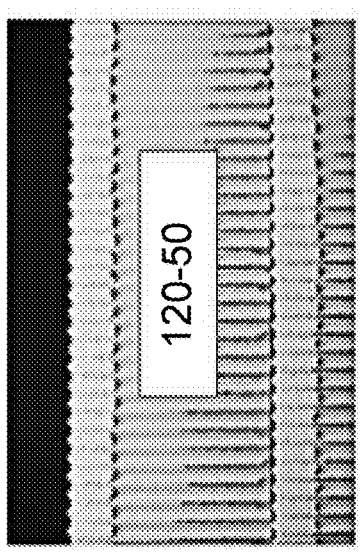
FIG. 15A is an image of plugs formed at a frequency of 125 Hz and a vibrational amplitude of 2 G.
Figure 15B:
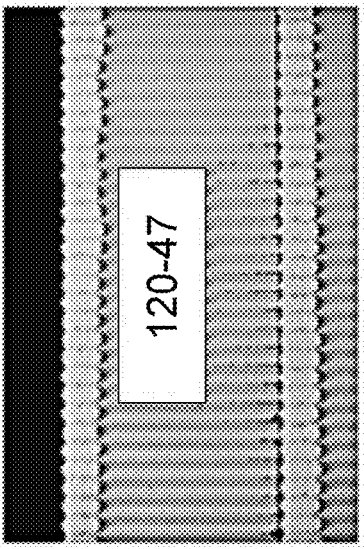
FIG. 15B is an image of plugs formed at a frequency of 125 Hz and a vibrational amplitude of 4 G.
Figure 15C:
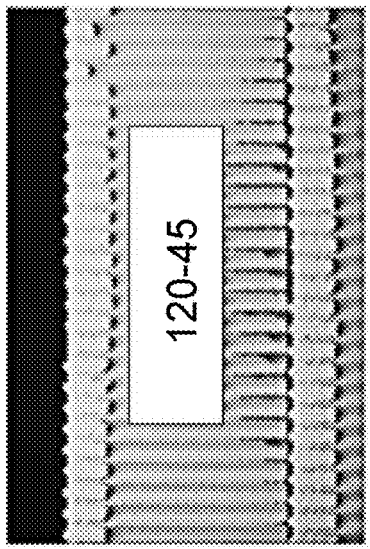
FIG. 15C is an image of plugs formed at a frequency of 125 Hz and a vibrational amplitude of 6 G.
Figure 16A:
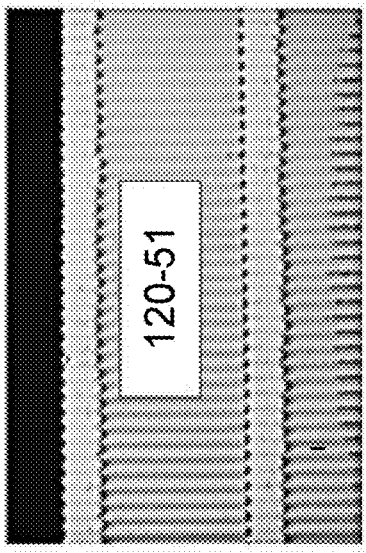
FIG. 16A is an image of plugs formed at a frequency of 125 Hz and a vibrational amplitude of 5 G.
Figure 16B:
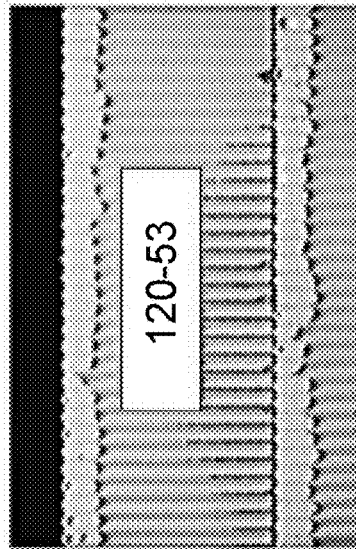
FIG. 16B is an image of plugs formed at a frequency of 125 Hz and a vibrational amplitude of 6 G.
Figure 16C:
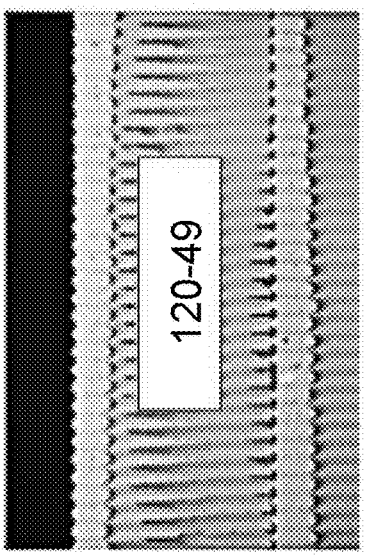
FIG. 16C is an image of plugs formed at a frequency of 125 Hz and a vibrational amplitude of 8 G.

Referring now to FIGS. 15A-16C, provided are a variety of images illustrating plug depth and uniformity under a variety of vibrational frequency and amplitude tests. FIG. 15A is a sample tested at a vibrational frequency of 125 Hz and a vibrational amplitude of 2 G. FIG. 15B is a sample tested at a vibrational frequency of 125 Hz and a vibrational amplitude of 4 G. FIG. 15C is a sample tested at a vibrational frequency of 125 Hz and a vibrational amplitude of 6 G. FIG. 16A is a sample tested at a vibrational frequency of 225 Hz and a vibrational amplitude of 5 G. FIG. 16B is a sample tested at a vibrational frequency of 225 Hz and a vibrational amplitude of 6 G. FIG. 16C is a sample tested at a vibrational frequency of 225 Hz and a vibrational amplitude of 8 G. As apparent, the vibrational range of 125 Hz to 255 Hz with a vibrational amplitude of 2 G to 8 G provides an operating window for the formation of the plugs.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise.

What is claimed is:

1. A method of plugging channels of a honeycomb body comprising a plurality of channels, the method comprising:
  applying a shear force to a plugging mixture to alter the viscosity of the plugging mixture from a first viscosity prior to the applying the shear force to a second viscosity which is less than the first viscosity, wherein the plugging mixture comprises a plurality of inorganic particles, clay, and a liquid vehicle;
  placing a honeycomb body into contact with the plugging mixture such that a portion of the plugging mixture having the second viscosity flows into the plurality of channels;
  reducing or stopping application of the shear force to increase the viscosity of the portion of the plugging mixture in the plurality of channels to greater than the first viscosity; and then
  removing the honeycomb body, along with the portion of the plugging mixture that flowed into the plurality of channels, from contact with a remaining portion of the plugging mixture;
  wherein the first viscosity is within a range of from about 25,000 cP to 400,000 cP and the second viscosity is about 15,000 cP or less.

2. The method of claim 1, wherein the clay comprises smectite clay.

3. The method of claim 1, wherein applying the shear force to the plugging mixture comprises vibrating the plugging mixture.

4. The method of claim 3, wherein vibrating the plugging mixture comprises vibrating the plugging mixture according to a vibration profile having a plurality of different frequencies, a plurality of different amplitudes, or both.

5. The method of claim 4, wherein vibrating the plugging mixture comprises variably transitioning from a first combination of one or more frequencies and amplitudes to a second combination of one or more frequencies and amplitudes.

6. The method of claim 3, wherein the plugging mixture is vibrated at a frequency of from about 10 Hz to about 500 Hz.

7. The method of claim 3, wherein the vibrating is conducted such that the plugging mixture is vibrated at a vibrational amplitude of from about 0.5 G to about 10 G.

8. The method of claim 1, wherein the plugging mixture is disposed in a receptacle before placing the honeycomb body into contact with the plugging mixture, and wherein the remaining portion of the plugging mixture remains in the receptacle when application of the shear force is stopped or reduced.

9. The method of claim 8, further comprising, after removing the honeycomb body from the plugging mixture, applying the shear force to the remaining portion of the plugging mixture to return the viscosity of the remaining portion of the plugging mixture back toward the second viscosity;
  placing a subsequent honeycomb body into contact with the remaining portion of the plugging mixture such that a portion of the plugging mixture flows into channels of the subsequent honeycomb body;
  reducing or stopping application of the shear force to increase the viscosity of the portion of the plugging mixture in channels of the subsequent honeycomb body to greater than the first viscosity.

10. The method of claim 1, wherein the clay comprises colloidal clay.

11. The method of claim 1, wherein a value of the first viscosity is about 400% or greater of that of the second viscosity.

12. The method of claim 1, wherein a value of the first viscosity is about 1000% or greater of that of the second viscosity.

13. The method of claim 1, wherein the second viscosity is about 10,000 cP or less.

14. The method of claim 1, further comprising:
  placing a mask layer into contact with a first end of the honeycomb body to cover at least some of the plurality of channels before placing the honeycomb body into contact with the plugging mixture; and
  forming a hole in the mask layer proximate at least one of the plurality of channels, wherein the hole has an area of about 80% or less of a cross-sectional area of the channel proximate the hole.

15. The method of claim 14, wherein the hole has an area of about 30% or less of the cross-sectional area of the channel proximate the hole.

16. The method of claim 1, wherein, after the removing, the portion of the plugging mixture within the plurality of channels is converted into plugs.

17. A honeycomb body plugged by the method of claim 16 wherein the plugs comprise a smectite clay and a plurality of inorganic particles, and wherein a standard deviation in length of the plugs is 2 mm or less.

18. The method of claim 1, wherein the portion of the plugging mixture within the plurality of channels is converted into plugs via heating, curing, drying, or calcining.

19. A method of plugging channels of a honeycomb body comprising a plurality of channels, the method comprising:
  applying a shear force to a plugging mixture to alter the viscosity of the plugging mixture from a first viscosity prior to the applying the shear force to a second viscosity which is less than the first viscosity, wherein the plugging mixture comprises a plurality of inorganic particles, clay, and a liquid vehicle;
  placing a honeycomb body into contact with the plugging mixture such that a portion of the plugging mixture having the second viscosity flows into the plurality of channels;
  reducing or stopping application of the shear force to increase the viscosity of the portion of the plugging mixture in the plurality of channels to greater than the first viscosity; and then
  removing the honeycomb body, along with the portion of the plugging mixture that flowed into the plurality of channels, from contact with a remaining portion of the plugging mixture;
  wherein applying the shear force to the plugging mixture comprises vibrating the plugging mixture, and
  wherein the plugging mixture is vibrated along at least two axes during the placing of the honeycomb body into contact with the plugging mixture.

20. The method of claim 19, wherein the plugging mixture is vibrated at different frequencies or different vibrational amplitudes along each of the at least two axes.

21. The method of claim 20, wherein the plugging mixture is vibrated at different frequencies or different vibrational amplitudes along each of the at least two axes.

* * * * *

UNITED STATES PATENT AND TRADEMARK OFFICE
CERTIFICATE OF CORRECTION

| | | |
|---|---|---|
| PATENT NO. | : 11,919,194 B2 | Page 1 of 1 |
| APPLICATION NO. | : 17/162240 | |
| DATED | : March 5, 2024 | |
| INVENTOR(S) | : Keith Norman Bubb et al. | |

It is certified that error appears in the above-identified patent and that said Letters Patent is hereby corrected as shown below:

On the Title Page

On the page 2, in Column 1, item (56) under "U.S. Patent Documents", Line 1, delete "To" and insert -- Ito --.

Signed and Sealed this
Thirtieth Day of September, 2025

John A. Squires
*Director of the United States Patent and Trademark Office*